(12) United States Patent
Chennichetty et al.

(10) Patent No.: US 11,838,880 B2
(45) Date of Patent: Dec. 5, 2023

(54) LOCATION AWARE STEERING USING FINE TIMING MEASUREMENT (FTM) FRAMES IN A WIRELESS LOCAL AREA NETWORK (WLAN)

(71) Applicant: QUALCOMM Incorporated, San Diego, CA (US)

(72) Inventors: Prakash Chennichetty, Chennai (IN); Manoj Sekar, Pondicherry (IN); Thanigaivel Nagendran, Chennai (IN); Subramanian Anantharaman, Chennai (IN); Sreekanth Natarajan, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/013,404

(22) Filed: Sep. 4, 2020

(65) Prior Publication Data
US 2022/0078727 A1 Mar. 10, 2022

(51) Int. Cl.
*H04W 56/00* (2009.01)
*H04B 17/318* (2015.01)
(Continued)

(52) U.S. Cl.
CPC ......... *H04W 56/001* (2013.01); *G01S 5/0284* (2013.01); *H04B 17/318* (2015.01);
(Continued)

(58) Field of Classification Search
CPC .............. H04W 56/001; H04W 64/003; H04B 17/318; G01S 5/0284
See application file for complete search history.

(56) References Cited

U.S. PATENT DOCUMENTS 6,377,812 B1 4/2002 Rashid-Farrokhi
9,332,523 B2 5/2016 Zhang et al.
(Continued)

FOREIGN PATENT DOCUMENTS

CN 109196899 1/2019
EP 3525527 8/2019
(Continued)

OTHER PUBLICATIONS

"802.11 Working Group of Lan/Wan Standard Committee of the IEEE Computer Society: IEEE Draft, Draft P802", Feb. 5, 2019.
(Continued)

*Primary Examiner* — Jamal Javaid
*Assistant Examiner* — Ryan C Kavleski
(74) *Attorney, Agent, or Firm* — Holland & Hart LLP/Qualcomm

(57) ABSTRACT

This disclosure provides methods, devices and systems for access point (AP) steering or frequency band steering based on a location of a station (STA). In some aspects, an AP may determine the location of the STA based on timing information and may steer the STA based on the location. To obtain the timing information, the AP may exchange fine timing measurement (FTM) frames with the STA. The AP may determine a distance between itself and the STA based on the timing information. The AP also may obtain distance information from other APs. Using the distance between itself and the STA, as well as the distance information from other APs, the AP may determine a location of the STA and steer the STA based on its location. The AP may steer the STA to a different frequency band of the same AP or to different AP altogether.

25 Claims, 20 Drawing Sheets

(51) Int. Cl.
*G01S 5/02* (2010.01)
*H04L 5/00* (2006.01)
*H04W 8/24* (2009.01)
*H04W 64/00* (2009.01)
*H04W 84/12* (2009.01)

(52) U.S. Cl.
CPC ............. *H04L 5/0055* (2013.01); *H04W 8/24* (2013.01); *H04W 56/009* (2013.01); *H04W 64/003* (2013.01); *H04W 84/12* (2013.01)

(56) References Cited

U.S. PATENT DOCUMENTS

| | | | |
|---|---|---|---|
| 9,432,882 | B2 | 8/2016 | Emadzadeh et al. |
| 10,284,299 | B2 | 5/2019 | Vardarajan et al. |
| 10,327,184 | B2 | 6/2019 | Srivastava et al. |
| 10,448,321 | B2 | 10/2019 | Gupta et al. |
| 10,542,466 | B1 | 1/2020 | Indurkar |
| 10,573,144 | B2 | 2/2020 | Emmanuel et al. |
| 10,674,331 | B1 | 6/2020 | Huang et al. |
| 10,945,231 | B1 | 3/2021 | Henry et al. |
| 11,166,159 | B1 | 11/2021 | Berger et al. |
| 2003/0058821 | A1 | 3/2003 | Lee et al. |
| 2008/0064404 | A1 | 3/2008 | Zhang et al. |
| 2011/0116407 | A1 | 5/2011 | Ren et al. |
| 2013/0152168 | A1 | 6/2013 | Nasir et al. |
| 2015/0063228 | A1 | 3/2015 | Aldana |
| 2015/0094103 | A1* | 4/2015 | Wang ............... H04W 52/0254 455/456.6 |
| 2016/0007278 | A1* | 1/2016 | Gupta ................ H04W 76/10 370/329 |
| 2016/0302079 | A1 | 10/2016 | Chari et al. |
| 2016/0366660 | A1 | 12/2016 | Segev et al. |
| 2017/0094619 | A1 | 3/2017 | Aldana |
| 2017/0171833 | A1* | 6/2017 | Vamaraju ............... H04W 48/16 |
| 2017/0181006 | A1 | 6/2017 | Vardarajan et al. |
| 2017/0251332 | A1 | 8/2017 | Aldana et al. |
| 2017/0353245 | A1* | 12/2017 | Vardarajan ............ H04W 16/20 |
| 2017/0367063 | A1 | 12/2017 | Venkatraman et al. |
| 2018/0054842 | A1 | 2/2018 | Kandagadla et al. |
| 2018/0067187 | A1 | 3/2018 | Oh et al. |
| 2019/0132748 | A1* | 5/2019 | Guo ..................... H04W 16/28 |
| 2019/0208464 | A1 | 7/2019 | Lee et al. |
| 2019/0297553 | A1 | 9/2019 | Wang et al. |
| 2020/0068520 | A1* | 2/2020 | Marri Sridhar ....... H04W 8/005 |
| 2021/0157386 | A1 | 5/2021 | Vegesna et al. |
| 2022/0078644 | A1 | 3/2022 | Chennichetty et al. |

FOREIGN PATENT DOCUMENTS

| | | |
|---|---|---|
| EP | 3700234 | 8/2020 |
| WO | 2019083419 | 5/2019 |
| WO | 2019106065 | 6/2019 |
| WO | 2022051051 | 3/2022 |
| WO | 2022051052 | 3/2022 |

OTHER PUBLICATIONS

"PCT Application No. PCT/US2021/044772 International Search Report and Written Opinion", dated Nov. 19, 2021, 11 pages.

"PCT Application No. PCT/US2021/044779 International Search Report and Written Opinion", dated Nov. 23, 2021, 13 pages.

"U.S. Appl. No. 17/013,436 Office Action", dated Feb. 11, 2022, 17 pages.

Adame, et al., "Channel Load Aware AP / Extender Selection in Home Wifi Networks Using IEEE 802.11k/v", Apr. 17, 2020, 17 pages.

* cited by examiner

LOCATION AWARE STEERING USING FINE TIMING MEASUREMENT (FTM) FRAMES IN A WIRELESS LOCAL AREA NETWORK (WLAN)

TECHNICAL FIELD

This disclosure relates generally to the field of wireless communication, and more particularly to implementing location aware steering using fine timing measurement (FTM) frames in a wireless local area network (WLAN).

DESCRIPTION OF THE RELATED TECHNOLOGY

A wireless local area network (WLAN) may be formed by one or more wireless access points (APs) that provide a shared wireless communication medium for use by multiple client devices, which also may be referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a service set identifier (SSID) that is advertised by the AP. An AP periodically broadcasts beacon frames to enable other STAs within wireless range of the AP to establish or maintain a communication link with the WLAN.

A WLAN may include two or more APs. In the WLAN, a STA may wirelessly associate with a first AP to obtain wireless access to other devices or networks. The STA may remain associated with the first AP while within an effect range of the first AP. As the STA moves outside the coverage area of the first AP, the first AP may steer the STA to associate with a second AP. Thus, the STA may seamlessly associate with the second AP without losing service.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication performed by an apparatus of a first access point (AP) in a wireless local area network (WLAN). The method may include determining whether a WLAN device is capable of exchanging fine timing management (FTM) frames. The method may include, in response to determining the WLAN device is capable of exchanging FTM frames, determining a first distance from the first AP to the WLAN device based, at least in part, on the FTM frames exchanged with the WLAN device, and obtaining an indication of a second distance between a second AP and the WLAN device. The method may include, in response to determining the WLAN device is capable of exchanging FTM frames, determining a location of the WLAN device based, at least in part, on the first distance and the second distance, and steering the WLAN device to the second AP based, at least in part, on the location of the WLAN device.

In some aspects, the location may be a relative location of the WLAN device with respect to the first AP and the second AP.

In some aspects, the method may include determining a signal strength of a signal received from the WLAN device, and determining that the signal strength is less than a signal strength threshold. The method of determining whether a WLAN device is capable of exchanging FTM frames may be in response to determining that the signal strength is less than a signal strength threshold.

In some aspects, the method of determining whether a WLAN device is capable of exchanging FTM frames may include obtaining, from the WLAN device, a capabilities element indicating the WLAN device is capable of exchanging FTM frames.

In some aspects, the method of determining the first distance is based, at least in part, on FTM frames exchanged with the WLAN device may include outputting the FTM frames for transmission to the WLAN device, and obtaining FTM acknowledgements (ACKs) associated with the FTM frames from the WLAN device. Determining the first distance is based, at least in part, on FTM frames exchanged with the WLAN device also may include determining a round-trip time (RTT) based, at least in part, on the FTM frames and the FTM ACKs, and determining the first distance based, at least in part, on the RTT.

In some aspects, the method of steering the WLAN device may include selecting steering information based, at least in part, on the location of the WLAN device, where the steering information indicates whether to steer the WLAN device based, at least in part, on the location. The method may include determining to steer the WLAN device to the second AP based, at least in part, on the steering information.

In some aspects, the method of obtaining the indication of the second distance may include receiving an FTM range report that indicates the second distance.

In some aspects, the method also may include outputting an FTM request for transmission to the WLAN device, obtaining an FTM ACK from the WLAN device, and in response to obtaining the FTM acknowledgment, exchanging the FTM frames with the WLAN device.

In some aspects, the method also may include obtaining, from the second AP, distance information including the indication of the second distance.

In some aspects, the method also may include obtaining distance information from other APs in the WLAN, the distance information indicating other distances from the other APs to the WLAN device.

In some aspects, the method also may include determining a third distance from the first AP to the WLAN device based, at least in part, on additional FTM frames exchanged with the WLAN device, and steering the WLAN device from a first frequency band of the first AP to a second frequency band of the first AP based, at least in part, on the third distance.

In some aspects, the method also may include, after steering the WLAN device, determining a signal strength of communications received from the WLAN device, determining that the signal strength is greater than a signal strength threshold, and updating steering information to indicate the location and the signal strength.

Another innovative aspect of the subject matter described in this disclosure can be implemented in method for wireless communication performed by an apparatus of an AP in a WLAN. The method may include determining whether a WLAN device is capable of exchanging FTM frames. The method may include, in response to determining the WLAN device is capable of exchanging the FTM frames, determining a distance from the AP to the WLAN device based, at least in part, on FTM frames exchanged with the WLAN device. The method also may include, in response to determining the WLAN device is capable of exchanging the FTM frames, steering the WLAN device from a first frequency band of the AP to a second frequency band of the AP based, at least in part, on the distance.

In some aspects, the method also may include determining a signal strength of a signal received from the WLAN device, and determining that the signal strength is less than a signal strength threshold, where determining whether a WLAN device is capable of exchanging FTM frames is in response to determining that the signal strength is less than a signal strength threshold.

In some aspects, the method also may include determining the AP has a wireless association with the WLAN device via the first frequency band, and determining that the WLAN device is outside a first range of the first frequency band of the AP based, at least in part, on the distance.

In some aspects, the method also may include determining the WLAN is within a second range of the second frequency band.

In some aspects, the method also may include outputting the FTM frames for transmission to the WLAN device, and obtaining FTM ACKs from the WLAN device.

In some aspects, the method of steering the WLAN device may include selecting steering information based, at least in part, on the distance from the AP to the WLAN device, and determining to steer the WLAN device to the second frequency band based, at least in part, on the steering information.

In some aspects, the method also may include, after steering the WLAN device, determining a signal strength of communications received from the WLAN device, determining that the signal strength is greater than a signal strength threshold, and updating steering information to indicate the distance and the signal strength.

Another innovative aspect of the subject matter described in this disclosure can be performed by an apparatus of a first access point (AP) for wireless communication. The apparatus may include a processor that may be configured to determine whether a WLAN device of a WLAN is capable of exchanging FTM frames. The processor may be configured to, in response to a determination that the WLAN device is capable of exchanging the FTM frames, determine a first distance from the first AP to the WLAN device based, at least in part, on FTM frames exchanged with the WLAN device, obtain an indication of a second distance between a second AP and the WLAN device, and determine a location of the WLAN device based, at least in part, on the first distance and the second distance. The apparatus also may include an interface configured to output a message to steer the WLAN device to the second AP based, at least in part, on the location of the WLAN device.

In some aspects, the processor also may be configured to determine a signal strength of a signal received from the WLAN device, and determine that the signal strength is less than a signal strength threshold. The determination whether a WLAN device is capable of exchanging FTM frames may be in response to determining that the signal strength is less than a signal strength threshold.

In some aspects, the processor is further configured to obtain the indication of the second distance from an FTM range report.

In some aspects, the interface may be further configured to output the FTM frames for transmission to the WLAN device and obtain FTM ACKs from the WLAN device. The processor may be further configured to determine an RTT based on the FTM frames and the FTM ACKs, and determine the first distance based on the RTT.

In some aspects, the processor may be further configured to select steering information based, at least in part, on the location of the WLAN device, where the steering information indicates whether to steer the WLAN device based, at least in part, on the location. The processor also may be configured to determine to steer the WLAN device to the second AP based, at least in part, on the steering information.

In some aspects, the processor may be further configured to determine the location is outside a first coverage area of a first frequency band of the first AP and within a second coverage area of a second frequency band of the first AP, and steer the WLAN device from the first frequency band of the first AP to the second frequency band of the first AP based, at least in part, on the location.

In some aspects, the processor may be further configured to determine a third distance from the first AP to the WLAN device based, at least in part, on additional FTM frames exchanged with the WLAN device, and steer the WLAN device from a first frequency band of the first AP to a second frequency band of the first AP based, at least in part, on the third distance.

Another innovative aspect of the subject matter described in this disclosure can be performed by an apparatus for wireless communication of an access point (AP). The apparatus may include a processor configured to determine whether a WLAN device of a WLAN is capable of exchanging FTM frames. The processor also may be configured to, in response to a determination that the WLAN device is capable of exchanging the FTM frames, determine a distance from the AP to the WLAN device based, at least in part, FTM frames exchanged with the WLAN device, and steer the WLAN device from a first frequency band of the AP to a second frequency band of the AP based, at least in part, on the distance.

In some aspects, the processor may be further configured to determine a signal strength of a signal received from the WLAN device, and determine that the signal strength is less than a signal strength threshold. The determination whether a WLAN device is capable of exchanging FTM frames may be in response to determining that the signal strength is less than a signal strength threshold.

In some aspects, the processor may be further configured to determine the AP has a wireless association with the WLAN device via the first frequency band, and determine that the WLAN device is outside a first coverage area of the first frequency band of the AP based, at least in part, on the distance.

In some aspects, the processor may be further configured to select steering information based, at least in part, on the distance of the WLAN device, and determine to steer the WLAN device to the second frequency band based, at least in part, on the steering information.

Another innovative aspect of the subject matter described in this disclosure can be implemented in a method for wireless communication in a WLAN performed by an apparatus of a first WLAN device. The method may include determining a first distance from the first WLAN device to a second WLAN device based, at least in part, on FTM frames exchanged with the second WLAN device. The method may include determining whether the first WLAN device is located within a distance range of the second WLAN device based, at least in part, on the first distance. The method may include determining a signal strength associated with the second WLAN device in response to the second WLAN device being within the distance range. The method may include comparing the signal strength to one or more signal strength thresholds. The method also may include providing a fine placement indicator based on the comparison.

In some aspects, the method of comparing the signal strength to one or more signal strength thresholds may include determining that the signal strength is less than a first signal strength threshold of the one or more signal strength thresholds. The first signal strength threshold may indicate a minimum signal strength for the distance range.

In some aspects, the method of providing the fine placement indicator may include providing a fine placement indicator indicating to move the first WLAN device nearer to the second WLAN device, in response to determining that the signal strength is less than the first signal strength threshold.

In some aspects, the method of comparing the signal strength to one or more signal strength thresholds may include determining that the signal strength is greater than a second signal strength threshold of the one or more signal strength thresholds, the second signal strength threshold indicating a maximum signal strength for the distance range.

In some aspects, the method of providing the fine placement indicator may include providing the fine placement indicator indicating to move the first WLAN device farther from the second WLAN device, in response to determining that the signal strength is greater than the second signal strength threshold.

In some aspects, the method of comparing the signal strength to one or more signal strength thresholds may include determining that the signal strength is greater than or equal to a first signal strength threshold of the one or more signal strength thresholds, the first signal strength threshold indicating a minimum signal strength for the distance range. The comparing the signal strength to one or more signal strength thresholds also may include determining that the signal strength is less than or equal to a second signal strength threshold of the one or more signal strength thresholds, the second signal strength threshold indicating a maximum signal strength for the distance range.

In some aspects, the method of providing the fine placement indicator may include providing the fine placement indicator indicating the first WLAN device to remain at a current location, in response to determining that the signal strength is greater than or equal to the first signal strength threshold and the signal strength is less than or equal to the second signal strength threshold.

In some aspects, the method may include determining one or more additional signal strengths associated with the second WLAN device in response to providing the fine placement indicator indicating the first WLAN device to remain at a current location. The method also may include updating distance information based on the one or more additional signal strengths.

In some aspects, the method may include determining, in response to the second WLAN device not being located within the distance range of the first WLAN device, whether the first distance is greater than the distance range. The method also may include providing a coarse placement indicator to move the first WLAN device nearer to the second WLAN device in response to determining the first distance is greater than the distance range.

In some aspects, the method may include determining, in response to the first WLAN device not being located within the distance range of the second WLAN device, whether the first distance is less than the distance range. The method also may include providing a coarse placement indicator to move the first WLAN device farther from the second WLAN device in response to determining the first distance is less than the distance range.

In some aspects, the method may include providing, in response to the first WLAN device being located within the distance range of the second WLAN device, a coarse placement indicator indicating the first WLAN device to remain at a current location in response to determining the first distance is within the distance range.

In some aspects, the method of determining the first distance from the first WLAN device to the second WLAN device based, at least in part, on FTM frames exchanged with the second WLAN device may include outputting a first FTM frame for transmission to the second WLAN device. The method may include obtaining a second FTM frame from the second WLAN device, and determining a RTT based on the first FTM frame and the second FTM frame. The method also may include determining the first distance based on the RTT.

In some aspects, the method of determining the signal strength associated with the second WLAN device may include determining a received signal strength indicator (RSSI) from signals received from the second WLAN device.

In some aspects, the distance range may include a range of distances between the first WLAN device and the second WLAN device.

Another innovative aspect of the subject matter described in this disclosure can be implemented in a method of wireless communication in a WLAN performed by an apparatus of a first WLAN device. The method may include determining a first distance from the first WLAN device to a second WLAN device based, at least in part, on FTM frames exchanged with the second WLAN device. The method may include determining whether the first WLAN device is located within a distance range of the second WLAN device based, at least in part, on the first distance. The method may include determining channel state information (CSI) associated with the second WLAN device in response to the second WLAN device being within the distance range. The method may include comparing the CSI to one or more CSI thresholds. The method may include providing a fine placement indicator based on the comparison.

In some aspects, the method of comparing the CSI to one or more CSI thresholds may include determining that the CSI is less than a first CSI threshold of the one or more CSI thresholds. The first CSI threshold may indicate one or more of scattering, fading and power decay over distance for the distance range.

In some aspects, the method of providing the fine placement indicator includes providing the fine placement indicator indicating to move the first WLAN device nearer to the second WLAN device, in response to determining that the CSI is less than the first CSI threshold.

In some aspects, the method of comparing the CSI to one or more CSI thresholds may include determining that the CSI is greater than a second CSI threshold of the one or more CSI thresholds. The second CSI threshold may indicate one or more of scattering, fading and power decay over distance for the distance range.

In some aspects, the method of providing the fine placement indicator may include providing the fine placement indicator indicating to move the first WLAN device farther from the second WLAN device, in response to determining that the CSI is greater than the second CSI threshold.

In some aspects, the method of comparing the CSI to one or more CSI thresholds may include determining that the CSI is greater than or equal to a first CSI threshold of the one or more CSI thresholds. The first CSI threshold may indicate a minimum CSI for the distance range. The method also may include determining that the CSI is less than or equal to a second CSI threshold of the one or more CSI thresholds. The second CSI threshold may indicate a maximum CSI for the distance range.

In some aspects, the method of providing the fine placement indicator may include providing the fine placement indicator indicating the first WLAN device to remain at a current location, in response to determining that the CSI is greater than or equal to the first CSI threshold and the CSI is less than or equal to the second CSI threshold.

Another innovative aspect of the subject matter described in this disclosure can be performed by an apparatus of a first WLAN device for wireless communication. The apparatus may include one or more interfaces for communicating via a WLAN. The apparatus may include one or more processors that may be configured to determine a first distance from the first WLAN device to a second WLAN device based, at least in part, on FTM frames exchanged with the second WLAN device via the one or more interfaces. The one or more processors may be configured to determine whether the first WLAN device is located within a distance range of the second WLAN device based, at least in part, on the first distance. The one or more processors also may be configured to determine a signal strength associated with the second WLAN device in response to the second WLAN device being within the distance range and compare the signal strength to one or more signal strength thresholds. The one or more processors also may be configured to output a fine placement indicator based on the comparison.

In some aspects, the one or more processors may be configured to compare the signal strength to one or more signal strength thresholds, and the one or more processors may be configured to determine that the signal strength is less than a first signal strength threshold of the one or more signal strength thresholds. The first signal strength threshold may indicate a minimum signal strength for the distance range.

In some aspects, the one or more processors may be configured to provide the fine placement indicator, and the one or more processors may be configured to provide, in response to a determination that the signal strength is less than the first signal strength threshold, the fine placement indicator indicating to move the first WLAN device nearer to the second WLAN device.

In some aspects, the one or more processors may be configured to compare the signal strength to one or more signal strength thresholds, and the one or more processors may be configured to determine that the signal strength is greater than a second signal strength threshold of the one or more signal strength thresholds. The second signal strength threshold may indicate a maximum signal strength for the distance range.

In some aspects, the one or more processors may be configured to provide the fine placement indicator, and the one or more processors may be configured to provide the fine placement indicator indicating to move the first WLAN device farther from the second WLAN device, in response to a determination that the signal strength is greater than the second signal strength threshold.

In some aspects, the one or more processors may be configured to compare the signal strength to one or more signal strength thresholds, and the one or more processors may be configured to determine that the signal strength is greater than or equal to a first signal strength threshold of the one or more signal strength thresholds, the first signal strength threshold indicating a minimum signal strength for the distance range. The one or more processors may be configured to determine that the signal strength is less than or equal to a second signal strength threshold of the one or more signal strength thresholds. The second signal strength threshold may indicate a maximum signal strength for the distance range.

In some aspects, the one or more processors may be configured to provide the fine placement indicator, and the one or more processors may be configured to provide the fine placement indicator indicating the first WLAN device to remain at a current location, in response to a determination that the signal strength is greater than or equal to the first signal strength threshold and the signal strength is less than or equal to the second signal strength threshold.

Another innovative aspect of the subject matter described in this disclosure can be performed by a wireless communication apparatus of a first WLAN device for wireless communication. The wireless communication apparatus of a first WLAN may include one or more interfaces for communicating via a WLAN and one or more processors. The apparatus may include one or more processors that may be configured to determine a first distance from the first WLAN device to a second WLAN device based, at least in part, on FTM frames exchanged with the second WLAN device via the one or more interfaces. The one or more processors may be configured to determine whether the first WLAN device is located within a distance range of the second WLAN device based, at least in part, on the first distance, and determine CSI associated with the second WLAN device in response to the second WLAN device being within the distance range. The one or more processors may be configured to compare the CSI to one or more CSI thresholds and output a fine placement indicator based on the comparison.

In some aspects, the CSI may include receiver CSI (CSIR) and transmitter CSI (CSIT), and the one or more processors may be configured to determine a difference between CSIT and CSIR. The comparison of the CSI to one or more CSI thresholds may include comparing the difference between the CSIT and CSIR to the one or more CSI thresholds.

Another innovative aspect of the subject matter described in this disclosure can be implemented as a computer-readable medium having stored therein instructions which, when executed by a processor, causes the processor to perform any one of the above-mentioned methods.

Another innovative aspect of the subject matter described in this disclosure can be implemented as a system having means for implementing any one of the above-mentioned methods.

Details of one or more aspects of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
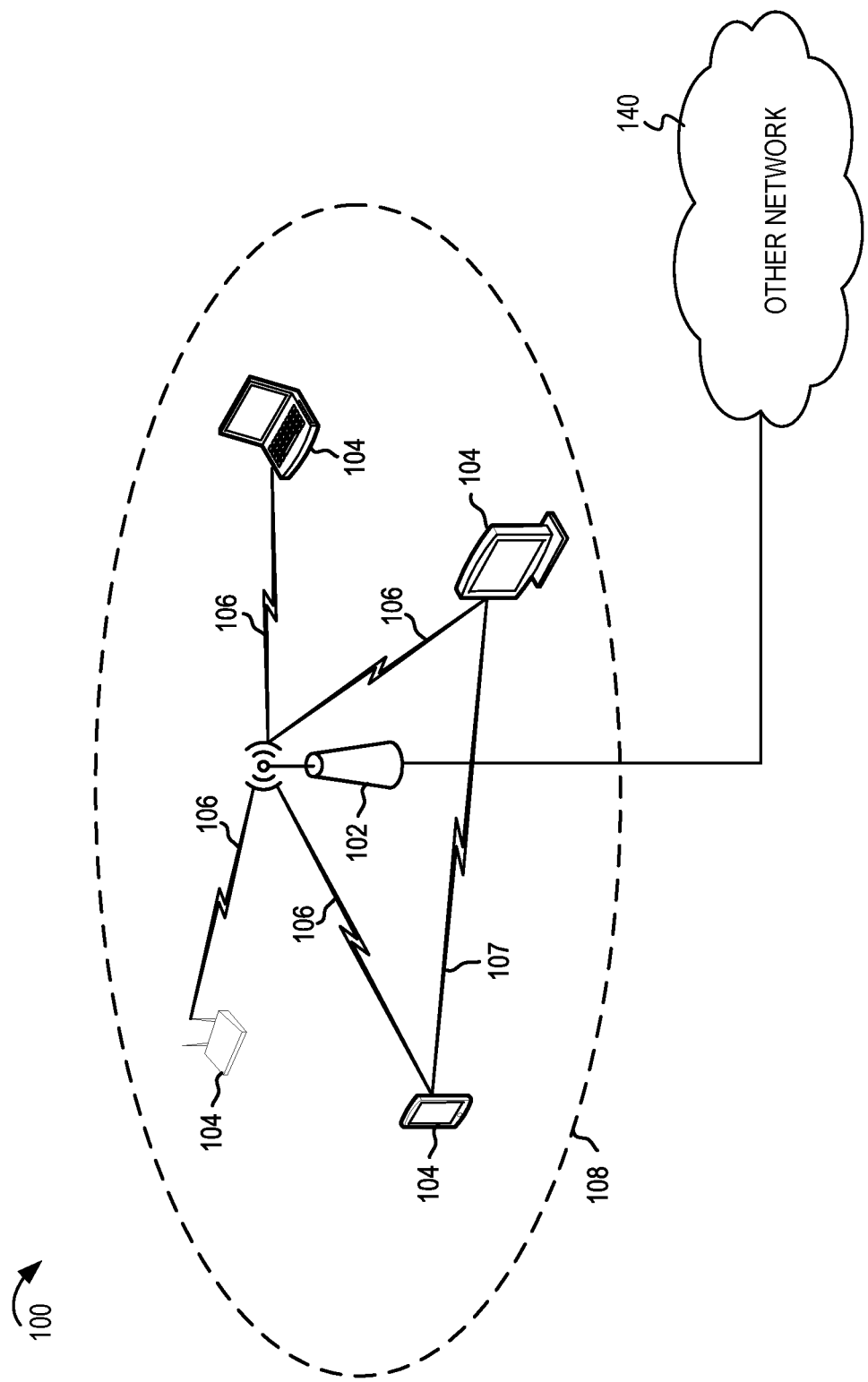
FIG. 1 shows a system diagram of an example wireless communication network.

The following description is directed to certain aspects for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described aspects may be implemented in any device, system or network that is capable of transmitting and receiving radio frequency (RF) signals according to one or more of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

A wireless local area network (WLAN) in a home, apartment, business, or other type of environment may include two or more WLAN devices. A WLAN may include one or more access points (APs) and one or more stations (STAs). An AP is a type of STA that performs a distribution system access function in the WLAN. For brevity, this disclosure refers to the WLAN devices which could either operate as an AP or a STA. An AP may provide wireless access to the STAs that are located in a coverage area of the AP. The STAs may include various types of WLAN devices such as mobile phones, laptops, gaming systems (including virtual and augmented reality systems (VR and AR, or collectively XR)), entertainment systems, smart appliances, wearables, and IoT devices. Some APs may be capable of establishing connectivity via more than one frequency band. For example, an AP may operate a first basic service set (BSS) on a first frequency band (such as a 2.4 GHz frequency band) and a second BSS on a second frequency band (such as a 5 GHz frequency band). For brevity, the first and second BSSs may be referred to as a first frequency band of the AP and a second frequency band of the AP, respectively.

WLANs typically provide network connectivity throughout a physical space. As a STA moves into the space, it may receive signals from a first AP such as a beacon frame and other signals. The STA may associate with the first AP to establish connectivity to the WLAN. If the STA moves outside a coverage area of the first AP, the signal strength of the signals received from the first AP may weaken. In some instances, the STA may be unaware of other APs, so it may remain associated with the first AP despite the weak signals. In response to the weak signals, the STA may scan for a different AP that may provide stronger signals. For example, as the STA moves outside the coverage area of the first AP, the STA may enter the coverage area of a second AP. As the STA enters the coverage area of the second AP, the first AP may attempt to steer the STA to associate with the second AP.

Various aspects of this disclosure relate generally to AP steering or frequency band steering based on a location of a STA. Some aspects more specifically relate to the use of the fine timing measurement (FTM) procedure to determine the relative distance or location of the STA for steering the STA from one AP to another AP. Some aspects relate to using the FTM procedure to determine the relative distance or location of the STA for steering the STA from a first frequency band of an AP to a second frequency band of that AP. In some implementations, an AP may determine the location of the STA based on timing information and may steer the STA based on the location. To obtain the round trip timing (RTT) information, the AP may exchange FTM frames with the STA. The AP may determine a distance between itself and the STA based on the RTT information. The AP also may obtain distance information from other APs, where the distance information may include a distance between another AP and the STA. Using the distance between itself and the STA and additional distance information (such as a distance between another AP and the STA), the AP may determine a location of the STA and steer the WLAN device based on its location. The AP may steer the WLAN device to a different frequency band of the AP or to different AP.

To facilitate steering, WLAN devices typically exchange signal information such as beacon measurement reports (defined in IEEE 802.11k) and received signal strength indicators (RSSI) measurements. For example, an AP may request a beacon measurement report from a STA, and the STA may provide the beacon measurement report to the AP. The beacon measurement report may include signal strength information of one or more beacon frames obtained from one or more APs of the WLAN. The exchange of the beacon measurement report and other signal information using existing techniques may not be instantaneous, and in some instances beacon reports may not be available. Thus, the steering process may be delayed or may not occur. For example, although the APs may periodically request beacon measurement reports, the STAs may not respond to the requests. For example, the STA may not receive the request from the AP due to interference in the WLAN and thus may not respond to the AP. As another example, the STA may delay responding to the request due to network congestion. Hence, the APs may postpone their steering processes until the APs receive the beacon measurement reports. In some instances, postponing the steering process causes the STA to remain connected to the first AP even when the STA has moved into the coverage area of the second AP which could have served the STA better than the first AP. In some instances, steering delays cause APs to miss opportunities for band steering and network load balancing. For example, some APs initiate steering when an RSSI measurement for a STA is less than a signal strength threshold. As the STA moves away from the AP, RSSI updates may be delayed because of communication problems related to low signal strength. Delayed RSSI updates may cause the AP to miss an opportunity to steer the STA to another AP. Delayed RSSI updates also may cause the AP to miss an opportunity for steering the STA from a first frequency band of the AP to a second frequency band of the AP. While the AP is waiting for the RSSI update, the STA may associate with a different AP. As an AP misses band steering opportunities, other APs in the WLAN may become overloaded.

Fine timing measurement (FTM) is a protocol that was introduced in IEEE 802.11-2016 (which incorporated IEEE 802.11mc). WLAN devices may exchange FTM frames and determine RTT by using time of departure (TOD) and time of arrival (TOA) timestamps captured during frame exchange. RTT information may include the TOD and TOA timestamps. Based on the RTT information, a WLAN device may measure an RTT relative to another WLAN device. The WLAN device may multiply the RTT by 0.5 and an approximate speed of light in the wireless medium to determine a distance between the WLAN devices. The WLAN device may repeat the process with other WLAN devices to determine relative distances of the other WLAN devices or to determine its location based on the relative distances to the other WLAN devices and their known locations.

In some implementations, an AP may determine the location of a STA based on RTT information and may steer the STA based on the location. In some implementations, an AP may exchange FTM frames with a STA to obtain RTT information that indicates a distance from the AP to the STA. The AP also may obtain distance information from other APs in the WLAN. Using the distance to the STA and the additional distance information, the AP may determine a location of the STA and steer the STA based on the location of the STA relative to the AP or to another AP.

In some implementations, a first AP may determine a first distance from itself to a STA based on RTT information. For example, the first AP may exchange FTM frames with the STA. The FTM frames may include RTT information indicating an RTT of communications between the AP and STA. Using the RTT, the AP may determine the first distance from the AP to the STA. In some implementations, the first AP also may determine a second distance from a second AP to the STA. For example, the first AP may obtain distance information from a second AP, where the distance information includes the second distance—the distance from the STA to the second AP. As another example, the first AP may obtain the distance information in an FTM range report received from the second AP or any suitable STA. In some implementations, the first AP may determine a location of the STA based on the first and second distances. The first AP may determine whether to steer the STA based on the location of the STA. For example, the first AP may steer the STA to the second AP based on the location of the STA, i.e., the STA may be more proximate to the second AP, or the STA may be capable of receiving signals with higher relative strength based on its location.

In some implementations, the first AP may steer the STA to a different frequency band. For example, the first AP may steer the STA from a second frequency band of the AP to a first frequency band of the AP based on the location of the STA. As the STA enters the coverage area of the first frequency band, the AP may steer the STA from the second frequency band to the first frequency band. For example, the first frequency band of the AP may have a greater coverage area compared to the coverage area of the second frequency band of the AP. Thus, the AP may steer the STA to the first frequency band when the STA moves to a further distance from the AP.

In some implementations, the first AP may access steering information that indicates whether to steer the STA based on its location. Depending on the location of the STA, the steering information may direct the first AP not to steer the STA, to steer the STA to the second AP, or to steer the STA to a different frequency band of the first AP, as described further herein. For example, the steering information may indicate a set of steering decisions for corresponding locations. In some implementations, the steering information may include other information, such as target APs to which the STA will be steered, distance information related to other APs, location information related to other APs, signal information related to other APs, or any other information suitable to provide a basis for determining whether to steer a WLAN device.

Some STAs may not support the FTM feature specified in IEEE 802.11-2016 and thus may not support obtaining or exchanging FTM frames. Hence, in some implementations, an AP may determine whether a STA is capable of exchanging FTM frames. In some implementations, during association, the AP may receive one or more elements indicating whether the STA is capable of obtaining or exchanging FTM frames. For example, during association, the AP may receive an Extended Capabilities element in which a field indicates the STA is capable of acting as an FTM responder. If the STA is capable of acting as an FTM responder, the STA is FTM-capable. In some implementations, the AP may receive a capabilities element indicating the STA can provide range reports indicating ranges between the STA and other APs, where the ranges are determined using the FTM procedure. A STA that is not FTM-capable also may be referred to as being FTM-incapable. An AP can determine locations of FTM-capable STAs based on RTT information obtained from the STAs and distance information from other APs. The AP may determine whether to steer the STA based on the location of the STA.

In some implementations, steering may be triggered by weak signal strength. For example, an AP may detect that an RSSI for a STA is less than a signal strength threshold. In response to determining that the RSSI for the STA is less than the signal strength threshold, the AP may determine whether the STA is FTM-capable and perform steering based on an FTM-derived location of the STA. Thus, the FTM and steering procedure may be triggered based on a reduction or change in the RSSI of signals received from the STA. The change in the RSSI may indicate, among other things, a change in the location of the STA relative to the AP. Thus, when the RSSI changes below the signal strength threshold, the AP may initiate the FTM to determine an updated location for the STA. If the STA has moved to a new location, the AP may determine whether to steer the STA based on the new location.

In some implementations, an AP can band steer FTM-capable STAs without information from other WLAN devices. For example, a STA may be associated with a second frequency band of the AP. However, the first frequency band of the AP may support a greater distance compared to the second frequency band of the AP. The AP may exchange FTM packets with the STA to determine a distance from the AP to the STA. Based on the distance, the AP may steer the STA from a second frequency band of the AP to a first frequency band of the AP.

Particular implementations of the subject matter described in this disclosure can be implemented to realize one or more of the following potential advantages. Traditional techniques for steering may involve APs sending information requests that go ignored by STAs. Unresponsive STAs may hinder the steering process. In some implementations, APs may use the FTM procedure to obtain information used in steering and achieve better responsiveness from the STAs. In some implementations, an AP using RTT information derived from FTM frames to determine the location of a STA may lead to faster steering decisions compared to existing steering techniques that use signal information such as beacon measurement reports and RSSI. The AP making faster steering decisions also may result in fewer missed steering opportunities. Using RTT information also may result in the AP more accurately determining the location of the STA. As location accuracy increases, the WLAN may make better and more consistent steering decisions. Faster and more accurate steering may lead to better STA performance and a better user experience.

Providing wireless access throughout an environment may be challenging for a single AP because various conditions may adversely affect wireless signals. As wireless signals travel over relatively long distances from the AP, the wireless signals may lose signal strength, which may degrade the wireless service being provided to STAs in the WLAN. In some environments, objects and materials may absorb, reflect, interfere with or otherwise adversely affect wireless signals. Adding one or more range extenders (REs) to a WLAN may increase signal strength in areas relatively far away from APs and in areas where wireless signals are adversely affected by environmental conditions. REs may be additional APs in a WLAN that may extend coverage areas by receiving and retransmitting wireless signals between WLAN devices. For example, the REs may retransmit wireless signals from a central AP (CAP) to STAs in the WLAN and vice versa. The CAP may be an AP that is connected to a gateway. REs and other APs may extend the service of the CAP and can be connected via wired or wireless links to the CAP.

The location of an RE may impact how well the RE increases the coverage area or otherwise increases signal strength in the WLAN. The RE may perform a process that assists in placing the RE at a suitable location. Traditional RE placement processes are based on the measured signal strength of signals received from an AP. Based on the signal strength, the RE may provide feedback indicating whether the RE should be moved nearer to an AP, farther from the AP, or remain at its current location. In some instances, there is not a simple relationship between signal strength and distance from the AP. For example, environmental conditions (such as objects, walls, and other obstructions) may cause a first RE near the AP to have lower signal strength than a second RE that is farther from the AP.

Various aspects of this disclosure relate generally to assisting with RE placement in an environment. Some aspects more specifically relate to using both FTM frames and signal strength to assist in placing the RE at a suitable location within the environment. The RE may use FTM frames to guide aspects of a coarse placement of the RE and signal strength to guide a fine placement of the RE. FTM may enable the RE to measure an RTT from itself to the AP based on FTM frames it sends to and receives from the AP. After measuring the RTT, the RE may determine a first distance from itself to the AP by multiplying the RTT by an approximate speed of light in the wireless medium. By using FTM, the RE uses RTT information and not signal strength to determine the first distance. By using RTT information (such as FTM), the RE may determine the first distance to the AP without considering how environmental conditions may affect the signal strength.

Using a first distance from the RE to the AP, the RE may determine whether it is located within an acceptable distance range from the AP for coarse placement of the RE. The acceptable distance range may be a distance range that extends the coverage area of the AP in the WLAN in a suitable manner, while maintaining a suitable signal strength. Hence, by using the acceptable distance range, the RE may use RTT information to find distances at which the signal strength and coverage area may be suitable during the coarse placement of the RE. The RE may provide a coarse placement indicator to indicate whether to move the RE nearer to the AP, farther from the AP, or whether the RE is within the acceptable distance range. The RE may repeat operations related to coarse placement until the RE is within the acceptable distance range of the AP.

If the RE is within the acceptable distance range, the RE may perform operations for a fine placement of the RE. In response to the RE determining it is located within an acceptable distance range of the AP, the RE may determine a signal strength associated with the AP. For example, for fine placement of the RE, the RE may determine an RSSI from signals received from the AP.

The RE may compare the signal strength to one or more signal strength thresholds. The one or more signal strength thresholds may relate to one or more signal strength ranges that indicate whether the RE should be relocated for fine placement of the RE. For example, a first signal strength threshold may identify a minimum signal strength below which the RE should be moved nearer to the AP. A second signal strength threshold may identify a maximum signal strength above which the RE should be moved farther from the AP. A range of values including the minimum signal strength and the maximum signal strength may indicate a signal strength range in which the RE should remain at its current location. Hence, comparing the signal strength to one or more signal strength thresholds may indicate whether the signal strength is too high, too low or within an acceptable range.

Based on a comparison of the signal strength to one or more signal strength thresholds, the RE may provide a fine placement indicator to assist with fine placement of the RE in the environment. As noted, the comparison may indicate whether the signal strength is too high, too low or within a suitable signal strength range. The fine placement indicator may relate to whether the signal strength is too high, too low or in a suitable signal strength range. For example, if the signal strength is too high, the fine placement indicator may be an indication to move the RE farther from the AP. If the signal strength is too low, the fine placement indicator may be an indication to move the RE nearer to the AP. If the signal strength is in a suitable signal strength range, the fine placement indicator may be an indication for the RE to remain at its current location. The fine placement indicator may include or otherwise cause presentation of any suitable audible or visible indication (such as beeps, flashing lights, or text on a screen) to move the RE in the environment.

Particular implementations of the subject matter described in this disclosure also can be implemented to realize one or more of the following potential advantages. In some implementations, an RE using RTT information derived from FTM frames to determine a distance to an AP may lead to faster RE placement decisions compared to RE placement techniques that use only signal information such as RSSI. The RE also may utilize signal information to provide more accurate placement guidance compared to traditional techniques for RE placement. The RE also may utilize channel state information to provide more accurate and robust placement guidance compared to traditional techniques for RE placement. The RE making faster, more accurate and more robust placement decisions may create a better user experience by reducing time users are waiting for guidance (such as audible or visual indicia) about where to place the RE within an environment.

FIG. 1 shows a system diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11aa, 802.11ah, 802.11ad, 802.11aq, 802.11ay, 802.11ax, 802.11az, 802.11ba and 802.11be). The WLAN 100 may include numerous WLAN devices such as an access point (AP) 102 and multiple stations (STAs) 104 that have a wireless association with the AP 102. While only one AP 102 is shown, the WLAN 100 also can include multiple APs 102. The IEEE 802.11-2016 standard defines a STA as an addressable unit. An AP is an entity that contains at least one STA and provides access via a wireless medium (WM) for associated STAs to access a distribution service (such as another network, not shown). Thus, an AP includes a STA and a distribution system access function (DSAF). In the example of FIG. 1, the AP 102 may be connected to a gateway device (not shown) which provides connectivity to the other network 140. The DSAF of the AP 102 may provide access between the STAs 104 and another network 140. While AP 102 is described as an access point using an infrastructure mode, in some implementations, the AP 102 may be a traditional STA which is operating as an AP. For example, the AP 102 may be a STA capable of operating in a peer-to-peer mode or independent mode. In some other examples, the AP 102 may be a software AP (SoftAP) operating on a computer system.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a media access control (MAC) address of the AP 102. The AP 102 periodically broadcasts beacon frames ("beacons") including the BSSID to enable any STAs 104 within wireless range of the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP. The AP 102 may provide access to external networks (such as the network 140) to various STAs 104 in the WLAN via respective communication links 106. To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 may assign an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 107. Additionally, two STAs 104 may communicate via a direct communication link 107 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 107 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of standards (such as that defined by the IEEE 802.11-2016 specification or amendments thereof including, but not limited to, 802.11aa, 802.11ah, 802.11aq, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs).

Each of the frequency bands may include multiple sub-bands or frequency channels. For example, PPDUs conforming to the IEEE 802.11n, 802.11ac, 802.11ax and 802.11be standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs conforming to the IEEE 802.11n, 802.11ac, 802.11ax, and 802.11be standard amendments may be transmitted over physical channels having bandwidths of 40 MHz, 80 MHz, 80+80 MHz, 160 MHz, 160+160 MHz or 320 MHz by bonding together two or more 20 MHz channels, which can be contiguously allocated or non-contiguously allocated. For example, IEEE 802.11n describes the use of up to 2 channels (for a combined 40 MHz bandwidth) and defined a High Throughput (HT) transmission format. IEEE 802.11ac describes the use of up to 8 channels (for a maximum combined 160 MHz bandwidth) and defined a Very High Throughput (VHT) transmission format. IEEE 802.11ax also supports up to a combined 160 MHz bandwidth (which may be a combination of up to 8 channels of 20 MHz width each). IEEE 802.11be may support up to a combined 320 MHz bandwidth (which may be a combination of up to 16 channels of 20 MHz width each).

The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each PPDU is a composite structure that includes a PHY preamble, a PHY header, and a payload in the form of a PLCP service data unit (PSDU). For example, the PSDU may include the PHY preamble and header (which may be referred to as PLCP preamble and header) as well as one or more MAC protocol data units (MPDUs). The information provided in the PHY preamble and header may be used by a receiving device to decode the subsequent data in the PSDU. In instances in which PPDUs are transmitted over a bonded channel, the preamble and header fields may be duplicated and transmitted in each of the multiple component channels. The PHY preamble may be used for packet detection, automatic gain control and channel estimation, among other uses. The format of, coding of, and information provided in the PHY header is based on the particular IEEE 802.11 protocol to be used to transmit the payload, and typically includes signaling fields (such as SIG-A and SIG-B fields) that include BSS and addressing information, such as a BSS color and a STA ID.

Aspects of transmissions may vary based on a distance between a transmitter (for example, an AP 102 or a STA 104) and a receiver (for example, another AP 102 or STA 104). Wireless communication devices may generally benefit from having information regarding the location or proximities of the various STAs 104 within the coverage area. In some examples, relevant distances may be computed using RTT-based ranging procedures. Additionally, in some implementations, APs 102 and STAs 104 may be configured to perform ranging operations. Each ranging operation may involve an exchange of FTM frames (such as those defined in the IEEE 802.11mc specification or revisions or updates thereof).

Figure 2:
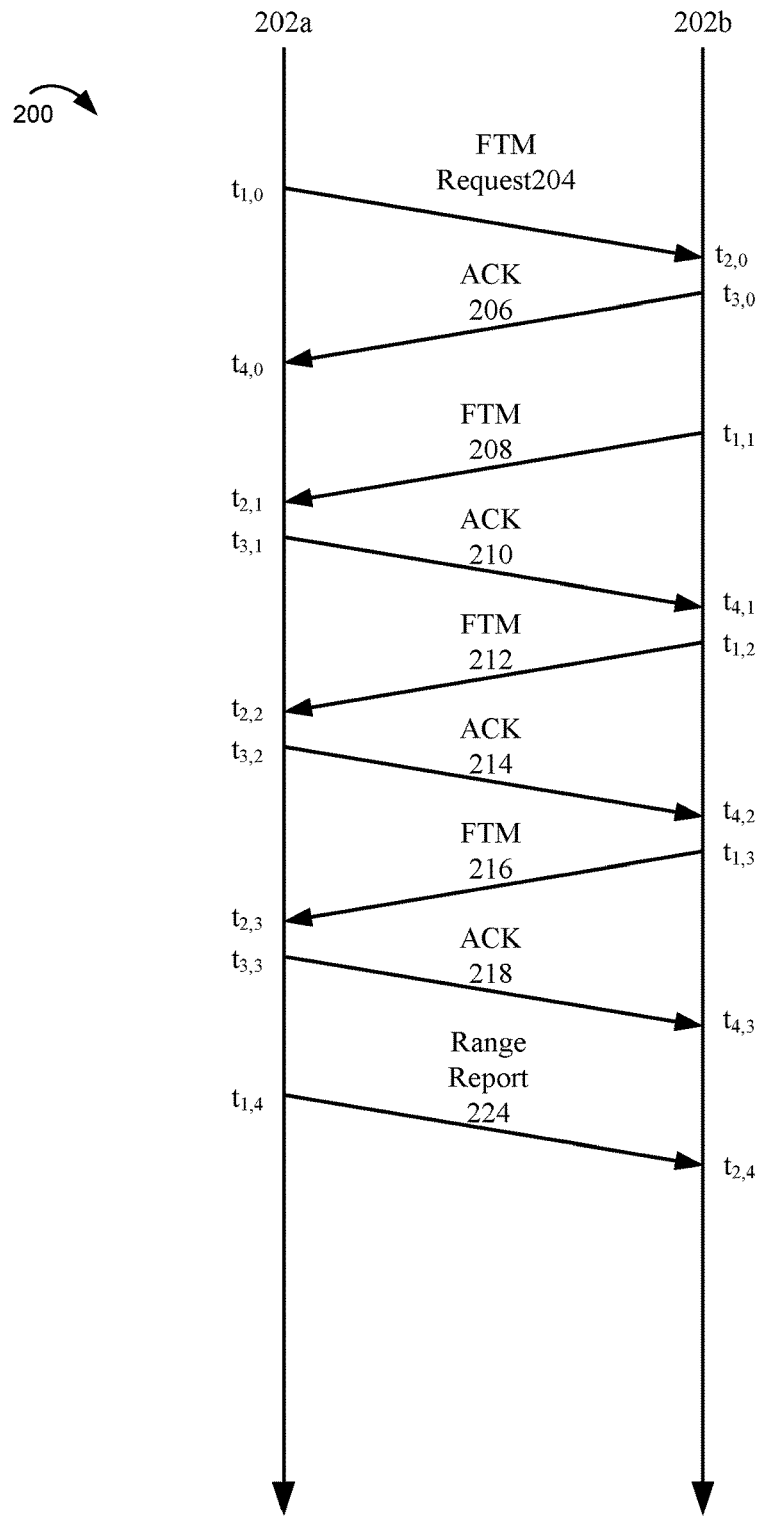
FIG. 2 shows a timing diagram illustrating an example process for performing a ranging operation.

FIG. 2 shows a timing diagram illustrating an example process for performing a ranging operation 200. The process for the ranging operation 200 may be cooperatively performed by two wireless devices 202a and 202b, which may each be an example of an AP 102 or a STA 104.

The wireless devices 202a and 202b may exchange FTM messages as part of a ranging operation 200. The ranging operation 200 may begin with the first wireless device 202a transmitting an initial FTM range request frame 204 at time t1,0. In some implementations, the second wireless device 202b may respond to the FTM range request 204 within approximately 10 milliseconds (+/−3 ms) of receiving it.

Responsive to successfully receiving the FTM range request frame 204 at time t2,0, the second wireless device 202b may respond by transmitting a first ACK 206 at time t3,0, which the first wireless device 202a may receive at time t4,0. The first wireless device 202a and the second wireless device 202b may exchange one or more FTM bursts, which may each include multiple exchanges of FTM action frames (hereinafter simply "FTM frames") and corresponding ACKs. One or more of the FTM range request frames 204 and the FTM action frames (hereinafter simply "FTM frames") may include FTM parameters specifying various characteristics of the ranging operation 200.

In the example shown in FIG. 2, in a first exchange, beginning at time t1,1, the second wireless device 202b may transmit a first FTM frame 208. The second wireless device 202b may record the time t1,1 as the TOD of the first FTM frame 208. The first wireless device 202a may receive the first FTM frame 208 at time t2,1 and may transmit a first acknowledgement frame (ACK) 210 to the second wireless device 202b at time t3,1. The first wireless device 202a may record the time t2,1 as the TOA of the first FTM frame 208, and the time t3,1 as the TOD of the first ACK 210. The second wireless device 202b may receive the first ACK 210 at time t4,1 and may record the time t4,1 as the TOA of the first ACK 210.

Similarly, in a second exchange, beginning at time t1,2, the second wireless device 202b may transmit a second FTM frame 212. The second FTM frame 212 may include a first field indicating the TOD of the first FTM frame 208 and a second field indicating the TOA of the first ACK 210. The first wireless device 202a may receive the second FTM frame 212 at time t2,2 and may transmit a second ACK 214 to the second wireless device 202b at time t3,2. The second wireless device 202b may receive the second ACK 214 at time t4,2. Similarly, in a third exchange, beginning at time t1,3, the second wireless device 202b may transmit a third FTM frame 216. The third FTM frame 216 may include a first field indicating the TOD of the second FTM frame 212 and a second field indicating the TOA of the second ACK 214. The first wireless device 202a may receive the third FTM frame 216 at time t2,3 and may transmit a third ACK 218 to the second wireless device 202b at time t3,3. The second wireless device 202b may receive the third ACK 218 at time t4,3.

The first wireless device 202a may determine a range indication based on the TODs and TOAs described above. For example, in implementations or instances in which an FTM burst includes four exchanges of FTM frames as described above, the first wireless device 202a may be configured to determine a round trip time (RTT) between itself and the second wireless device 202b based on Equation 1 below.

$$RTT = \frac{1}{2}((\Sigma L_{k=1}{}^2 t_{4,k} - \Sigma_{k=1}{}^2 t_{1,k})(\Sigma_{k=1}{}^2 t_{3,k} - \Sigma_{k=1}{}^2 t_{2,k})) \quad (1)$$

In some implementations, the range indication is the RTT. Additionally or alternatively, in some implementations, the first wireless device 202a may determine an actual approximate distance between itself and the second wireless device 202b, for example, by multiplying the RTT by 0.5 and by an approximate speed of light in the wireless medium. In such instances, the range indication may additionally or alternatively include the distance value. Additionally or alternatively, the range indication may include an indication as to whether the second wireless device 202b is within a proximity (for example, a service discovery threshold) of the first wireless device 202a based on the RTT. In some implementations, the first wireless device 202a may transmit the range indication to the second wireless device 202b, for example, in a range report 224 at time t1,4, which the second wireless device receives at time t2,4.

As described previously, this disclosure includes some example techniques in which the FTM protocol may be used to determine a location of a STA. An AP may determine whether to steer the STA to another AP or to another frequency band of the AP based on the location of the STA.

Figure 3:
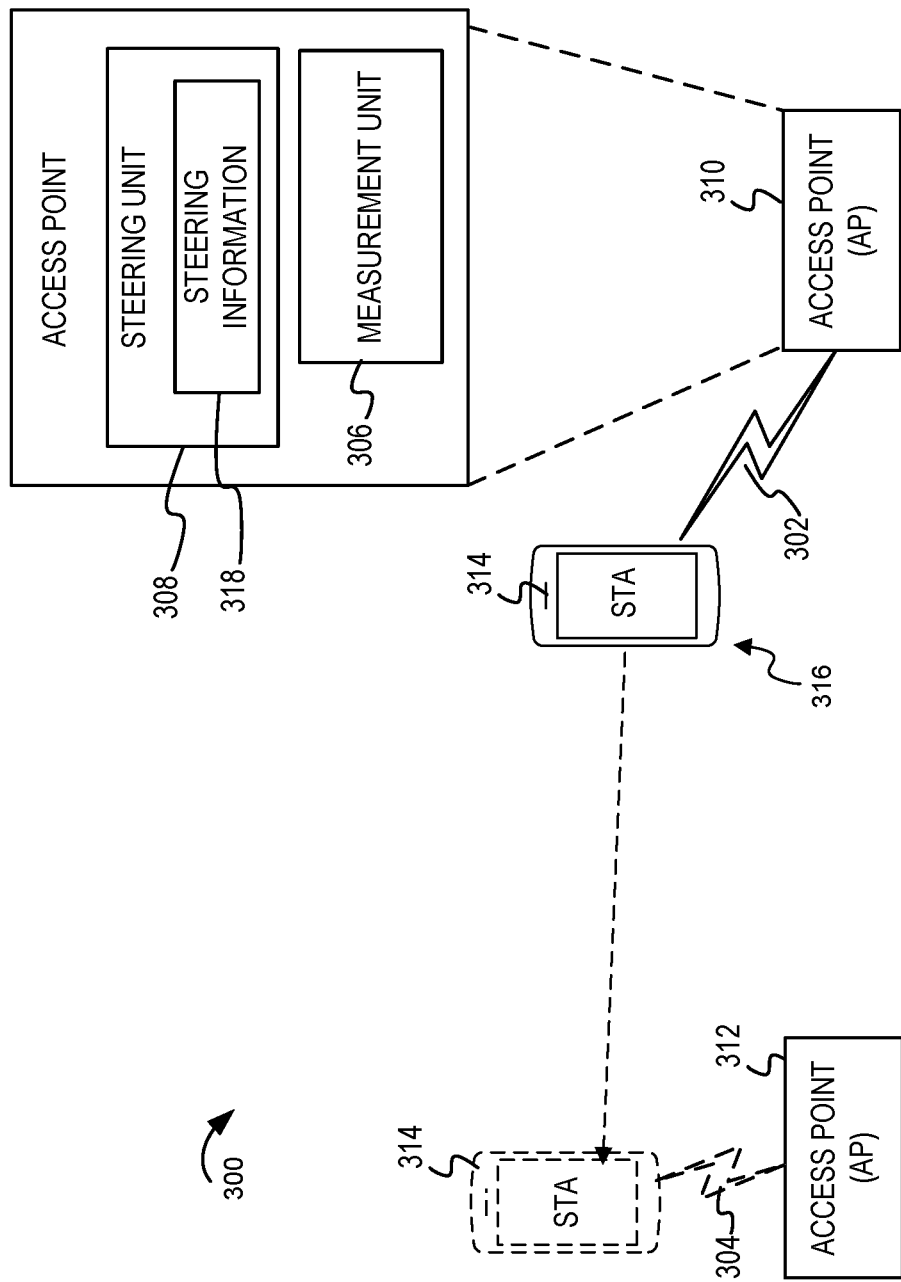
FIG. 3 shows a system diagram of an example wireless local area network (WLAN) including an access point (AP) configured to perform location aware steering based on timing information obtained from a station (STA).

FIG. 3 shows a system diagram of an example WLAN including an AP configured to perform location aware steering based on RTT information obtained from a STA. The WLAN 300 shown in FIG. 3 is based on the example WLAN 100 described in FIG. 1. The WLAN 300 includes the APs 310 and 312 and a STA 314. In various examples described herein, one or more of the WLAN devices, such as the STA 314, may be referred to as STAs for simplicity, regardless of whether the WLAN device is an AP or a non-AP STA. For example, the STA 314 may be either a non-AP STA or an AP. Furthermore, although not shown for simplicity, the WLAN 300 may include one or more additional STAs, which may include one or more additional APs and one or more additional non-AP STAs. In some implementations, the WLAN 300 may be configured as a mesh network, which may include the AP 310, the AP 312, and one or more additional APs. The APs 310 and 312 may be connected to a gateway device (not shown) which provides connectivity to another network. The APs 310 and 312 may be example implementations of the AP 102 of FIG. 1 or the AP 1902 of FIG. 19A. The STA 314 may be an example implementation of the STAs 104 of FIG. 1 or the STA 1904 of FIG. 19B.

Each of the APs 310 and 312 may include a measurement unit 306. The measurement unit 306 may determine distances from the AP to STAs. For example, in the AP 310, the measurement unit 306 may determine a distance from the AP 310 to the STA 314. In some implementations, the measurement unit 306 may determine distances based on signal information. For example, in AP 310, the measurement unit 306 may obtain signal information, such as RSSIs and beacon measurement reports, associated with the STA 314. The measurement unit 306 may determine the distance from the AP 310 to the STA 314 based on the signal information. In some implementations, the measurement unit 306 also may determine distances based on RTT information. From example, in the AP 310, the measurement unit 306 may determine a distance from the AP 310 to the STA 314 based on RTT information derived from FTM frames exchanged with the STA 314. The FTM frames may include timestamps that indicate an RTT between the AP 310 and the STA 314. Using the RTT, the measurement unit 306 may determine the distance between the AP 310 and the STA 314. The measurement unit 306 also may obtain location information from the AP 312. The location information may include a distance from the AP 312 to the STA 314. The location information also may include a location of the STA 314 relative to the AP 312. Using the distance from the AP 310 to the STA 314 and the location information obtained from the AP 312, the measurement unit 306 may determine a location of the STA 314. In some implementations, the location may be relative to the AP 310. The AP 310 may share location information about the STA 314 with other APs in the WLAN 300, such as the AP 312.

Each of the APs 310 and 312 also may include a steering unit 308. The steering unit 308 may include steering information 318 used in making steering decisions. In some implementations, the steering unit 308 may steer STAs based on locations determined by the measurement unit 306 and the steering information 318. The steering unit 308 may use a location to access a steering decision in the steering information 318. In some implementations, the steering information 318 may associate locations with steering decisions such as "steer" or "not steer." In some implementations, the steering information indicates a target AP to which the STA will be steered (such as the AP 312). The steering unit 308 may operate a feedback loop that updates the steering information 318. For example, after steering a STA, the steering unit 308 may measure signal strength at the STA to determine whether steering was effective. The steering unit 308 may update the steering information 318 based on this determination. The steering information 318 can be implemented as a data structure in a memory device. For example, in some implementations, the steering information 318 may include a lookup table including steering decisions that are indexed by location or area. In some other implementations, the steering information 318 can be organized in any other manner suitable for storing information and include any information suitable for determining a steering decision based on a location of the STA 314.

In some implementations, the STA 314 may begin at a first position 316 in the coverage area of the AP 310. While in the coverage area of the AP 310, the STA 314 has a wireless association 302 to the AP 310. Over a time period, the STA 314 may move closer to a coverage area of the AP 312. Over that time period, the AP 310 may determine the location of the STA 314 one or more times. To determine a location, the AP 310 may exchange FTM frames with the STA 314. The FTM frames may include RTT information that may be used to determine an RTT between the AP 310 and the STA 314. Based on the RTT, the AP 310 may determine a distance from the AP 310 to the STA 314. The AP 310 also may determine a distance from the STA 314 to the AP 312. For example, the AP 310 may obtain location information that indicates the distance from the STA 314 to the AP 312 via a measurement frame received from the AP 312. The AP 310 may use the distance along with location information obtained from the AP 312 to determine a location of the STA 314. In some implementations, the location may be relative to the AP 310. In some implementations, the AP 310 may determine a relative location of the STA using two or more distances to known locations, such as the respective distances from the STA 314 to the AP 312 and the STA 314 to the AP 310. If there are one or two distances to known locations, the AP 310 may represent the location of the STA 314 with a set of coordinates indicating points at which the STA 314 may reside. If there are three or more distances to known locations (such as distance information relating to three or more APs), the AP 310 may use trilateration to determine a single point representing a location of the STA 314 relative to the AP 310. The AP 310 may use the location of the STA 314 to determine whether to steer the STA 314. The AP 310 may periodically repeat the process of determining a location and determining whether to steer. Hence, over the time period in which the STA 314 is moving nearer to the AP 312, the AP 310 may determine one or more locations for the STA 314 and make one or more steering decisions about the STA 314. In some implementations, the AP 310 may access steering information that indicates whether to steer the STA 314 based on its location. Depending on the location of the STA 314, the steering information may direct the AP 310 to steer the STA 314 to the AP 312. After the AP 310 steers the STA 314 to the AP 312, the STA 314 establishes a wireless association 304 with the AP 312.

Steering refers to any activity which causes the device to wirelessly associate with a second AP instead of maintaining the association with a first AP. Steering also may be referred to as a re-association activity, move, transfer, relocate, transition, switch, re-position, handover, or the like. There are various techniques which can be used to steer a STA 314 to a particular AP or frequency band. For example, using IEEE 802.11v or other protocols, the AP 310 may simply request the device to re-associate to the AP 312. An IEEE 802.11v configuration message may include a list of one or more other APs (for example, including the AP 312) as a suggestion to the STA 314 to re-associate to the AP 312. However, if the STA 314 does not support IEEE 802.11v protocols or chooses to ignore the suggestion, the AP 310 may use another technique to steer the STA 314. For example, the AP 310 may send a disassociation message to the STA 314 or the AP 310 may block traffic (at least one incoming packet) for the STA 314 to force the STA 314 to re-associate with the AP 312.

Figure 4:
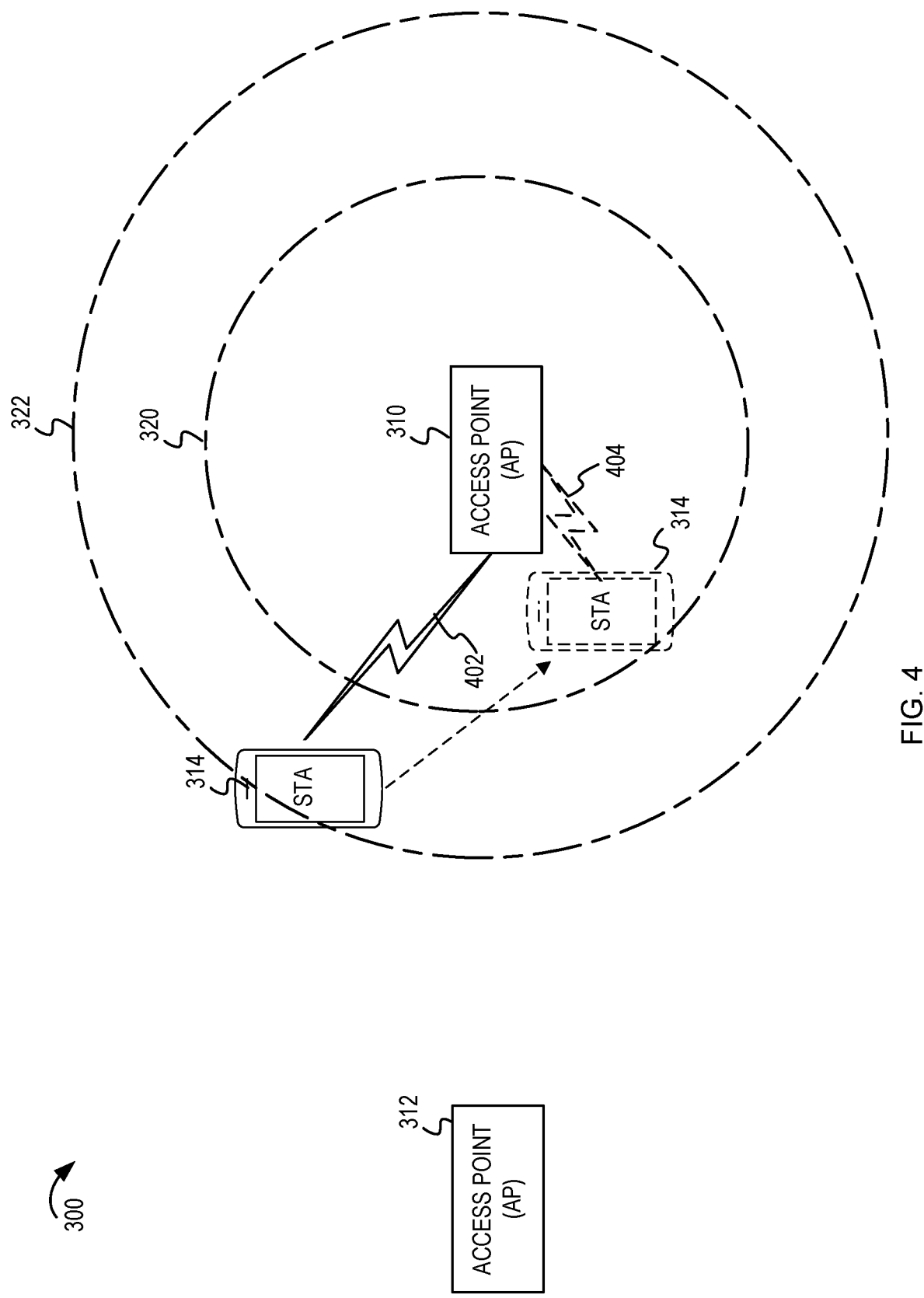
FIG. 4 shows a system diagram of an example WLAN including an AP configured to steer a STA from a first frequency band of the AP to a second frequency band of the AP.

FIG. 4 shows a system diagram of an example WLAN including an AP configured to steer a STA from a first frequency band of the AP to a second frequency band of the AP. As described in FIG. 3, the WLAN 300 may include the AP 310, the AP 312, and the STA 314.

The AP 310 may support communications over a first frequency band and a second frequency band. The first frequency band may include the 2.4 GHz band and the second frequency band may include the 5 GHz band. The first frequency band may have a coverage area represented by a first area within a circle 322. The second frequency band may have a coverage area represented by a second area within a circle 320.

Initially, the STA 314 may be within the coverage area of the first frequency band and may have a wireless association 402 to the AP 310 over the first frequency band. As the STA 314 moves around the environment, the AP 310 may track movements of the STA 314. The AP 310 may determine a distance from the AP 310 to the STA 314 based on RTT information included in FTM frames exchanged with the STA 314. The FTM frames may include timestamps that may be used to derive an RTT between the AP 310 and the STA 314. Using the RTT, the AP 310 may determine the distance from the AP 310 to the STA 314. The AP 310 can determine whether to steer the STA 314 based on the steering information 318 (as shown in FIG. 3) and the distance from the AP 310 to the STA 314. Initially, the AP 310 may not steer the STA 314 because the STA 314 is connected via the first frequency band and is located within its coverage area. Over time, the AP 310 may track movements of the STA 314 by repeating this process. As the STA 314 moves closer to the AP 310, the AP 310 may determine the STA 314 is within the coverage area of the second frequency band based on RTT information obtained from the STA 314. In response, the AP 310 may steer the STA 314 from the first frequency band to the second frequency band, resulting in the wireless association 404. As the AP 310 repeats the process of determining distances, the AP 310 may share the distances with the AP 312. For example, the AP 310 may transmit a management frame to the AP 312 to share location information that indicates the distance from the AP 310 to the STA 314.

Figure 5:
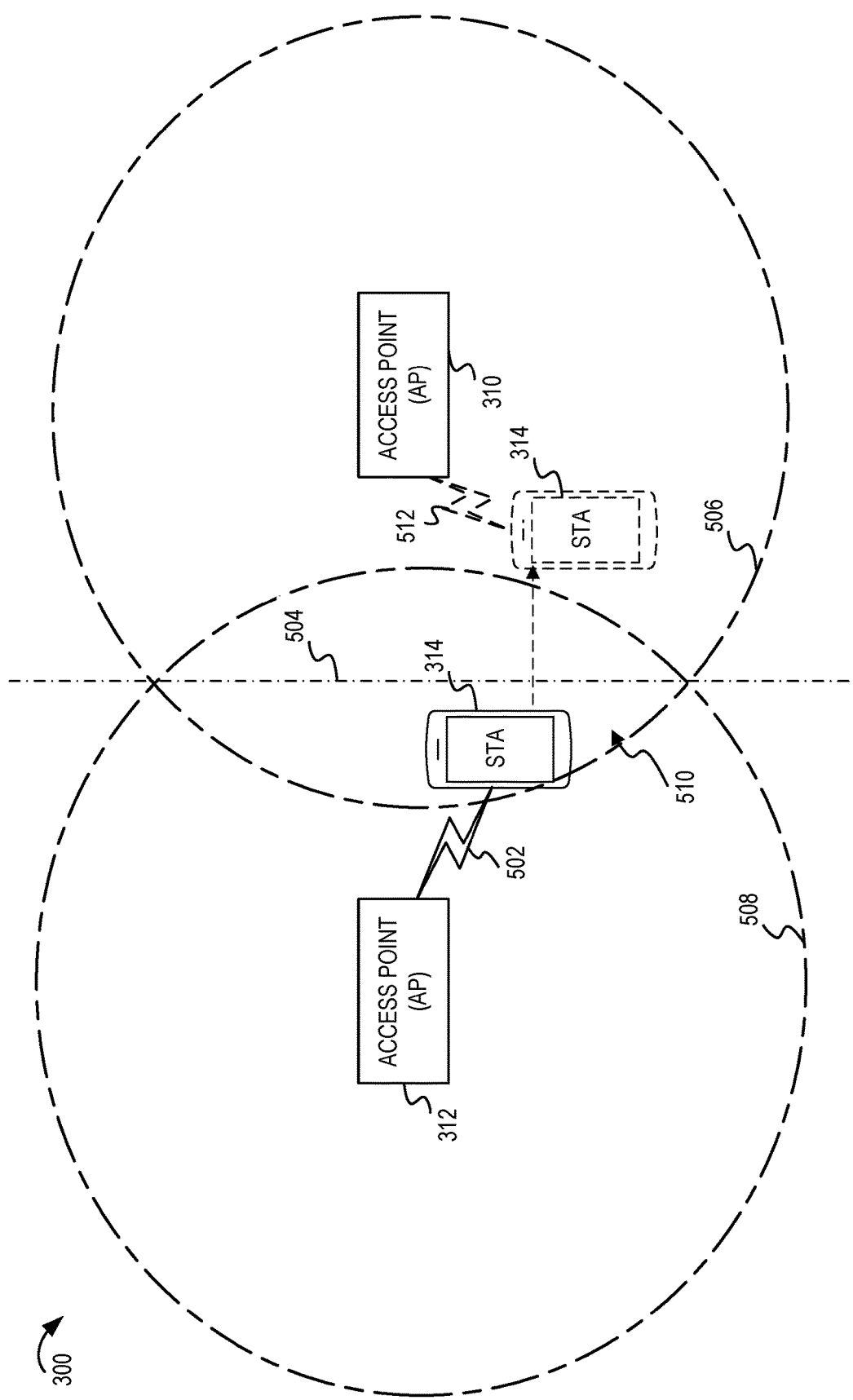
FIG. 5 shows a system diagram of an example WLAN including APs that perform steering operations in response to signal information.

FIG. 5 shows a system diagram of an example WLAN including APs that perform steering operations in response to signal information. As described in FIG. 3, the WLAN 300 may include the AP 310, the AP 312 and the STA 314.

As shown in FIG. 5, the AP 312 may have a coverage area inside the circle 508. The AP 310 may have a coverage area inside the circle 506. The ranges define an area 510 in which the STA 314 may be in the coverage area for both of the APs 310 and 312. A steering boundary 504 represents a distance from the AP 310 at which signal strength for the STA 314 may be less than a signal strength threshold. In some implementations, a steering process may be triggered when the signal strength is less than the signal strength threshold. For example, the STA 314 may be initially connected to the AP 312 via a wireless association 502. The AP 312 may monitor RSSI measurements to determine whether signal strength is less than the signal strength threshold. The AP 312 may determine an RSSI from one or more signals received from the STA 314. The AP 312 may determine whether the RSSI indicates a signal strength less than the signal strength threshold. As the STA 314 moves away from the AP 312, the signal strength may decrease. If the STA 314 moves past the steering boundary 504, the signal strength may drop below the signal strength threshold. In response to determining the signal strength is less than the signal strength threshold, the AP 312 may determine a location of the STA 314 based on RTT information associated with the STA 314 and location information obtained from the AP 310. For example, the AP 312 may exchange FTM frames with the STA 314. The FTM frames may include RTT information that may be used to determine an RTT between the AP 312 and the STA 314. Based on the RTT, the AP 312 may determine a distance from the AP 312 to the STA 314. The AP 312 also may determine a distance from the STA 314 to the AP 310. For example, the AP 312 may obtain location information that indicates the distance from the STA 314 to the AP 310 via a measurement frame received from the AP 310. The AP 312 may determine whether to steer the STA 314 based on the location of the STA 314. The AP 312 may access steering information that indicates whether to steer the STA based on its location. Depending on the location of the STA, the steering information may direct the AP 312 to steer the STA to the second AP. The AP 312 may steer the STA 314 to the AP 310. After steering, the STA 314 establishes a wireless association 512 with the AP 310. The AP 312 may share the distance from the AP 312 to the STA 314 and the location of the STA 314 with the AP 310.

Figure 6:
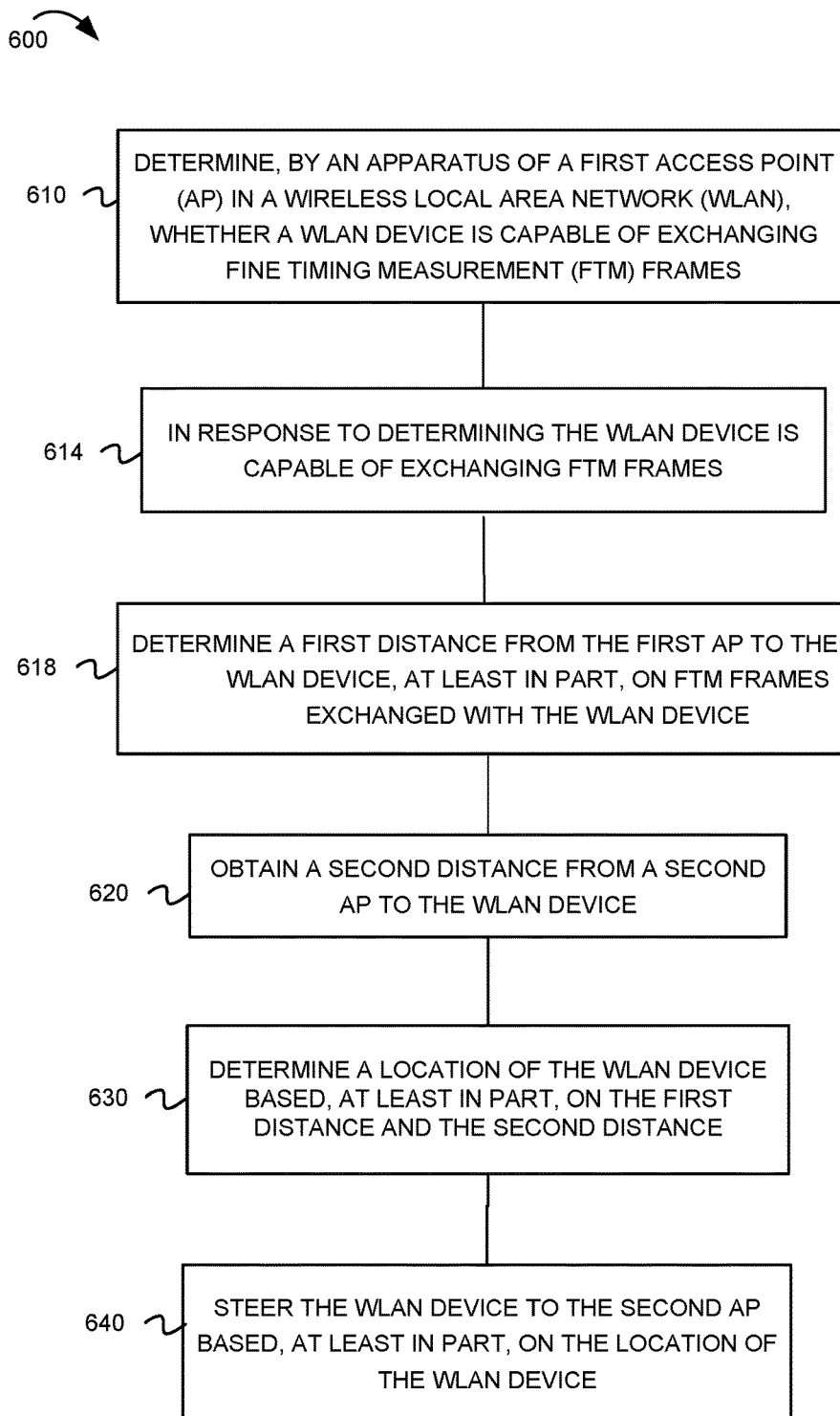
FIG. 6 depicts a process illustrating example operations performed by an apparatus of an AP for location aware steering.

FIG. 6 depicts a process 600 illustrating example operations performed by an apparatus of an AP for location aware steering. The process 600 may be performed by a wireless communication device such as the wireless communication device 1800 or the electronic device 2000 described with reference to FIGS. 18 and 20, respectively. In some implementations, the process 600 may be performed by a wireless communication device operating as or within an AP, such as one of the APs 102, 310, 312 and 1902 described with reference to FIGS. 1, 3, 4, 5 and 19A, respectively.

At block 610, an apparatus of a first AP in a WLAN may determine whether a WLAN device is capable of exchanging FTM frames.

At block 614, in response to determining the WLAN device is capable of exchanging FTM frames, the apparatus of the first AP may continue the process 600 at block 618.

At block 618, the apparatus of the first AP may determine a first distance from the first AP to the WLAN device based, at least in part, on FTM frames exchanged with the WLAN device.

At block 620, the apparatus of the first AP may obtain a second distance from a second AP to the WLAN device.

At block 630, the apparatus of the first AP may determine a location of the WLAN device based, at least in part, on the first distance and the second distance.

At block 640, the apparatus of the first AP may steer the WLAN to the remote AP based, at least in part, on the location of the STA.

Figure 7:
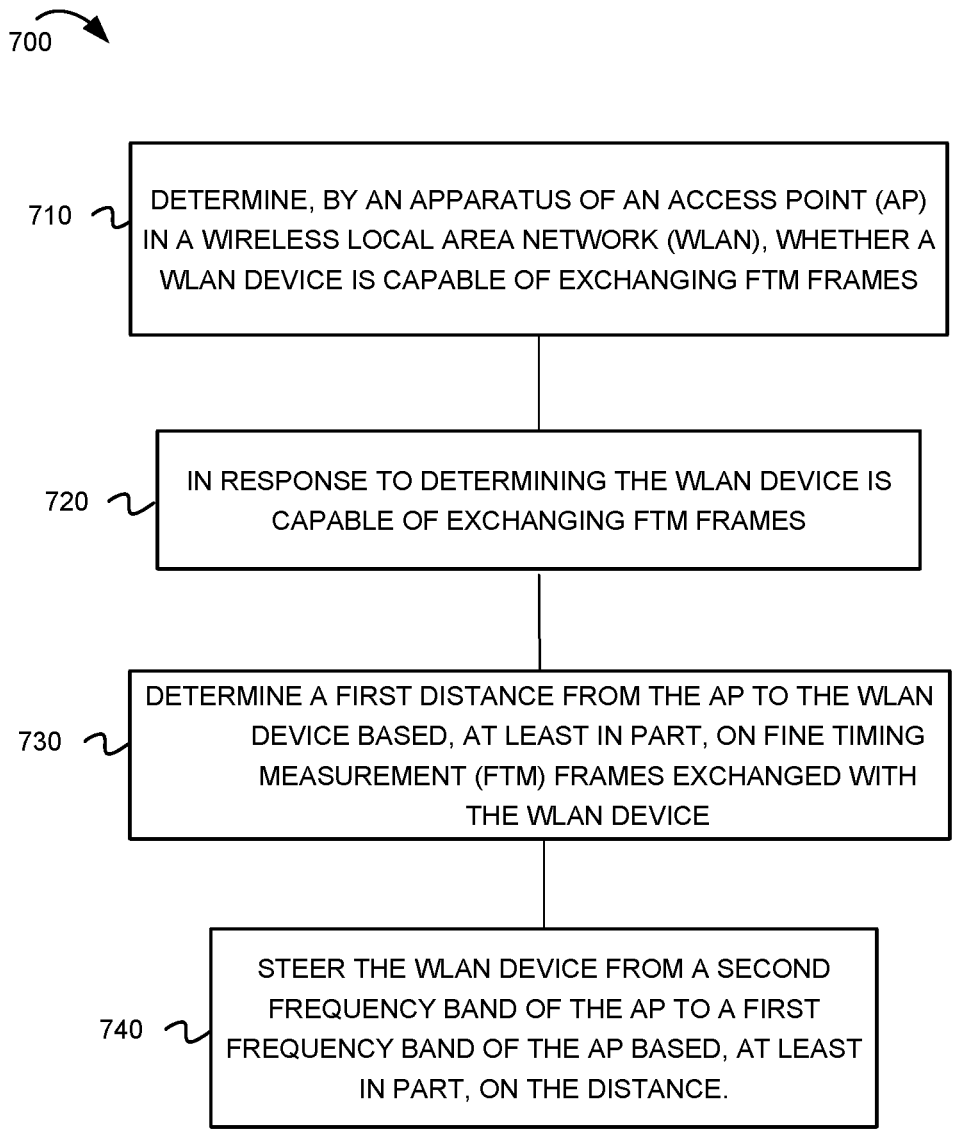
FIG. 7 depicts a process illustrating example operations performed by an apparatus of an AP for location aware band steering.

FIG. 7 depicts a process 700 illustrating example operations performed by an apparatus of an AP for location aware band steering. The process 700 may be performed by a wireless communication device such as the wireless communication device 1800 or the electronic device 2000 described with reference to FIGS. 18 and 20, respectively. In some implementations, the process 700 may be performed by a wireless communication device operating as or within an AP, such as one of the APs 102, 310, 312 and 1902 described with reference to FIGS. 1, 3, 4, 5 and 19A, respectively.

At block 710, the apparatus of the AP in the WLAN may determine whether a WLAN device is capable of exchanging FTM frames.

At block 720, in response to determining the WLAN device is capable of exchanging FTM frames, the process continues at block 730.

At block 730, the apparatus of the AP may determine a distance from the AP to a WLAN device of a WLAN based, at least in part, on FTM frames exchanged with the WLAN device.

At block 740, the apparatus of the AP may steer the WLAN device from a second frequency band of the AP to a first frequency band of the AP based, at least in part, on the distance.

Figure 8:
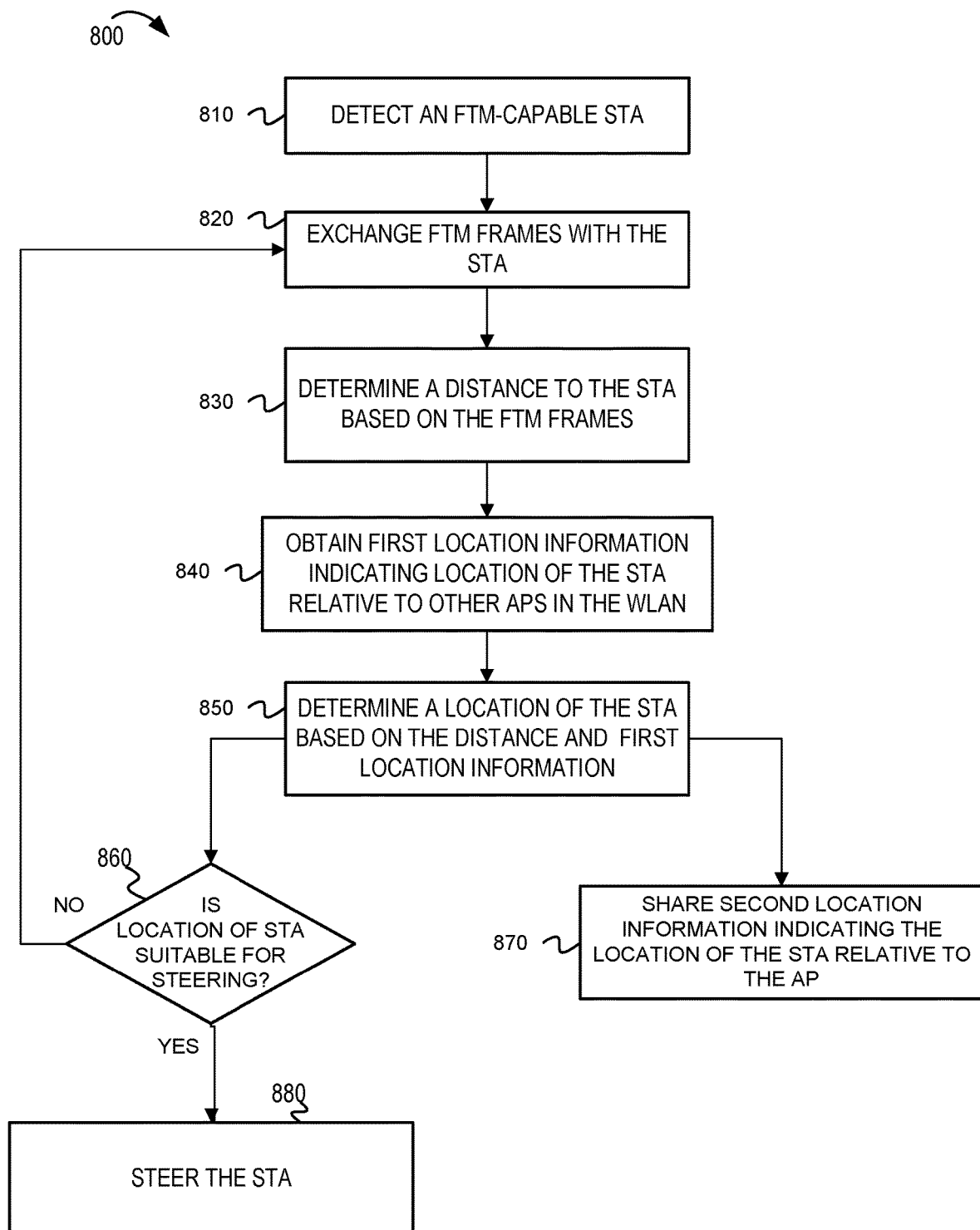
FIG. 8 depicts a process illustrating example operations for performing location aware steering with a fine timing measurement (FTM) capable STA.

FIG. 8 depicts a process 800 illustrating example operations for performing location aware steering with an FTM-capable STA. The process 800 may be performed by a wireless communication device such as the wireless communication device 1800 or the electronic device 2000 described with reference to FIGS. 18 and 20, respectively. In some implementations, the process 800 may be performed by a wireless communication device operating as or within an AP, such as one of the APs 102, 310, 312 and 1902 described with reference to FIGS. 1, 3, 4, 5 and 19A, respectively. The description of the flowchart 800 will refer to the AP 310 and other devices described with reference to FIG. 3.

At block 810, the AP 310 may detect an FTM-capable STA 314. In some implementations, the AP 310 may detect a probe request or other communication from the STA 314 indicating the STA 314 is FTM-capable. In some instances, the AP 310 may receive a capabilities element including a field that indicates the STA 314 FTM-capable. For example, the AP 310 may receive an Extended Capabilities element in which a field indicates the STA 314 is capable of acting as an FTM responder. If the STA 314 is capable of acting as an FTM responder, the STA 314 is FTM-capable. In some implementations, all STAs in the WLAN 300 may be FTM-capable.

At block 820, the AP 310 may exchange FTM frames with the STA 314. In some implementations, the AP 310 may output an FTM request for transmission to the STA 314. The STA may return an FTM ACK. In response to the FTM ACK, the AP 310 may exchange FTM frames with the STA 314. The FTM frames may include timestamps or other timing information that may be used to determine an RTT from the AP 310 to the STA 314.

At block 830, the AP 310 may determine a distance to the STA 314 based on the FTM frames. In some implementations, the AP 310 may determine a distance to the STA 314 based on the RTT associated with the FTM frames.

At block 840, the AP 310 may obtain first location information indicating a location of the STA 314 relative to other APs in the WLAN 300. In some implementations, the AP 310 may obtain the first location information from the AP 312 via management frames shared between the APs 310 and 312. The location information may include a distance between the AP 312 and the STA 314, a location of the STA 314 relative to the AP 312, distances between other APs (not shown in FIG. 3) in the WLAN 300, locations relative to the other APs, and any other suitable location information.

At block 850, the AP 310 may determine a location of the STA 314 based on the distance (determined at block 830) and the location information. In some implementations, the AP 310 may determine a location of the STA 314 using two or more distances to known locations, such as the respective distances from the STA to the AP 312 and the AP 310. If there are fewer than three distances, the AP 310 may represent the location of the STA with a set of coordinates indicating points at which the STA may reside. If there are three or more distances (such as when the distance information relates to three or more APs), the AP 310 may use trilateration to determine a single point representing a location of the STA 314. The operations may continue in parallel at block 860 and block 870.

At block 860, the AP 310 may determine whether the location of the STA 314 is suitable for steering. In some implementations, the AP 310 may make this determination based on the steering information 318. In some implementations, the steering information 318 may indicate steering decisions to be made at various locations. Using the location of the STA 314 as an index into the steering information 318, the AP 310 may obtain a steering decision associated with the location. In some implementations, the steering information 318 may include other information, such as target APs to which the STA 314 will be steered, distance information related to WLAN devices, location information related to WLAN devices, signal information related to WLAN devices and any other suitable information that may provide a basis for determining whether to steer a WLAN device. If the location is not suitable for steering, operations continue at block 820. If the location is suitable for steering, operations continue at block 880.

At block 880, the AP 310 may steer the STA 314. In some implementations, the AP 310 may steer the STA 314 to a target AP (such as the AP 312) indicated in the steering information 318.

At block 870, the AP 310 outputs second location information indicating the location of the STA 314 relative to the AP 310. The AP 312 and other APs in the WLAN 300 (not shown) may obtain the second location information and use it to perform location aware steering.

Figure 9:
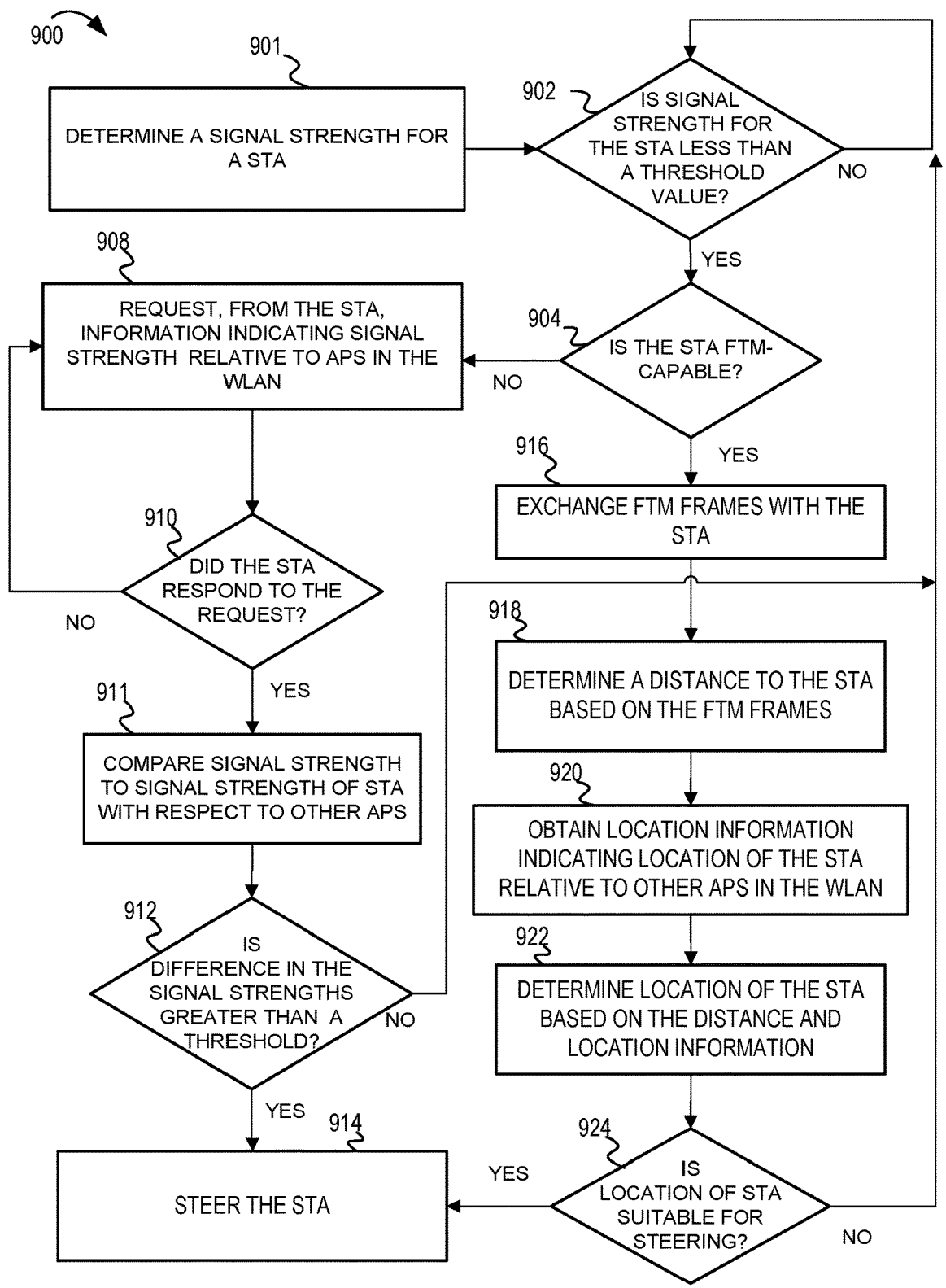
FIG. 9 depicts a process illustrating example operations for performing location aware steering in WLANs that include FTM-capable STAs and FTM-incapable STAs.

FIG. 9 depicts a process 900 illustrating example operations for performing location aware steering in WLANs that include FTM-capable STAs and FTM-incapable STAs. The process 900 may be performed by a wireless communication device such as the wireless communication device 1800 or the electronic device 2000 described with reference to FIGS. 18 and 20, respectively. In some implementations, the process 900 may be performed by a wireless communication device operating as or within an AP, such as one of the APs 102, 310, 312 and 1902 described with reference to FIGS. 1, 3, 4, 5, 19A and 20, respectively. The following description of the process 900 will refer to the AP 310 and other devices described with reference to FIG. 3.

At block 901, the AP 310 may determine a signal strength for a STA 314.

At block 902, the AP 310 may determine whether the signal strength for the STA 314 is less than a signal strength threshold. In some implementations, the AP 310 may determine an RSSI from one or more signals received from the STA 314, and may determine a signal strength based on the RSSI. In some implementations, the AP 310 also may determine whether other conditions are satisfied, such as whether a network load condition is satisfied. For example, the network load condition may be satisfied when a target AP for the steering operation (such as AP 312) is not overloaded. The network load condition may not be satisfied when the target AP (such as AP 312) is overloaded. If the signal strength is greater than or equal to the signal strength threshold or the network load condition is not satisfied, the AP 310 may continue monitoring signal strength by looping back to block 902. If the signal strength is less than a signal strength threshold or the network load condition is satisfied, the operations may continue at block 904.

At block 904, the AP 310 may determine whether the STA is FTM-capable. In some implementations, the AP 310 may receive a capabilities element including a field that indicates the STA 314 FTM-capable. For example, during association, the AP 310 may receive a capabilities element indicating the STA is capable of acting as an FTM responder. If the STA is capable of acting as an FTM responder, the STA is FTM-capable. If the STA 314 is FTM-capable, operations may continue at block 916. If the STA is not FTM-capable, operations may continue at block 908.

At block 908, the AP 310 may request, from the STA 314, information indicating a signal strength with respect to the AP 310 and other APs in the WLAN. In some implementations, the AP 310 may request a beacon measurement report that includes a received channel power indicator (RCPI) with respect to the AP 310 and other APs in the WLAN 300. The AP also may request other IEEE 802.11k reports (such as neighbor reports) or other information indicating signal strength with respect to the AP 310 and other APs. IEEE 802.11k is an amendment to IEEE 802.11 standard for radio resource management. It defines and exposes radio and network information to facilitate the management and maintenance of a WLAN.

At block 910, the AP 310 may determine whether the STA responded to the request for signal strength information. In some implementations, the STA 314 may provide one or more beacon measurement reports including the RCPI with respect to the AP 310 and other APs in the WLAN 300. The STA 314 may provide additional IEEE 802.11k information or any other suitable information indicating signal strength with respect to APs in the WLAN 300. If the STA 314 did not respond to the request for signal strength information, operations may continue at block 908. If the STA responded to the request for signal strength information, operations may continue at block 912.

At block 911, the AP 310 may be implemented to compare signal strength received from the STA 314 to a signal strength of the STA 314 with respect to other APs in the WLAN 300. In some implementations, the AP 310 may compare RCPI with respect to itself and the STA 314 with one or more RCPIs with respect to the STA 314 and other APs in the WLAN 300.

At block 912, the AP 310 may determine whether the difference in the signal strengths is greater than a signal strength threshold. In some implementations, the AP 310 may determine whether the difference in RCPIs is greater than a signal strength threshold. If the difference in the signal strengths is greater than the signal strength threshold, operations may continue at block 914. If the difference in the signal strengths is less than the signal strength threshold, operations may continue at block 902.

At block 914, the AP 310 may steer the STA 314. For STAs that are FTM-incapable, the AP 310 may steer the STA 314 to a target AP based on signal information (such as RCPI).

Referring back to block 904, if the STA 314 is FTM-capable, the operations may continue at block 916. At block 916, the AP 310 may exchange FTM frames with the STA 314. In some implementations, the AP 310 may output an FTM request for transmission to the STA 314. The STA 314 may return an FTM ACK. In response to the FTM ACK, the AP 310 may exchange FTM frames with the STA 314. The FTM frames may include timestamps or other timing information that may be used to determine an RTT from the AP 310 to the STA 314.

At block 918, the AP 310 may determine a distance to the STA 314 based on the FTM frames. In some implementations, the AP 310 may determine a distance to the STA 314 based on the RTT associated with the FTM frames.

At block 920, the AP 310 may obtain location information indicating a location of the STA 314 relative to other APs in the WLAN 300. In some implementations, the AP 310 may obtain the location information from the AP 312 via management frames shared between the APs 310 and 312. The location information may include a distance between the AP 312 and the STA 314, a location of the STA 314 relative to the AP 312, distances between other APs (not shown in FIG. 2) in the WLAN 300, locations relative to the other APs, and any other suitable location information.

At block 922, the AP 310 may determine a location of the STA 314 based on the distance (determined at block 918) and the location information. In some implementations, the AP 310 may determine a location of the STA 314 using two or more distances to known locations, such as the respective distances from the STA 314 to the AP 312 and the AP 310. If there are fewer than three distances, the AP 310 may represent the location of the STA 314 with a set of coordinates indicating points at which the STA 314 may reside. If there are three or more distances (such as when the distance information relates to three or more APs), the AP 310 may use trilateration to determine a single point representing a location of the STA 314.

At block 924, the AP 310 may determine whether the location of the STA 314 is suitable for steering. In some implementations, the AP 310 may make this determination based on the steering information 318. In some implementations, the steering information 318 may indicate steering decisions to be made at various locations. Using the location of the STA 314 as an index into the steering information 318, the AP 310 may obtain a steering decision associated with the location. In some implementations, the steering information 318 may include other information, such as target APs to which the STA 314 will be steered, distance information related to WLAN devices, location information related to WLAN devices, signal information related to WLAN devices and any other suitable information that may provide a basis for determining whether to steer a WLAN device. If the location is not suitable for steering, operations continue at block 902. If the location is suitable for steering, operations continue at block 914.

If the operations move to block 914 from block 924, the AP 310 may steer the STA 314 to a target AP (such as the AP 312) indicated in the steering information 318.

Figure 10:
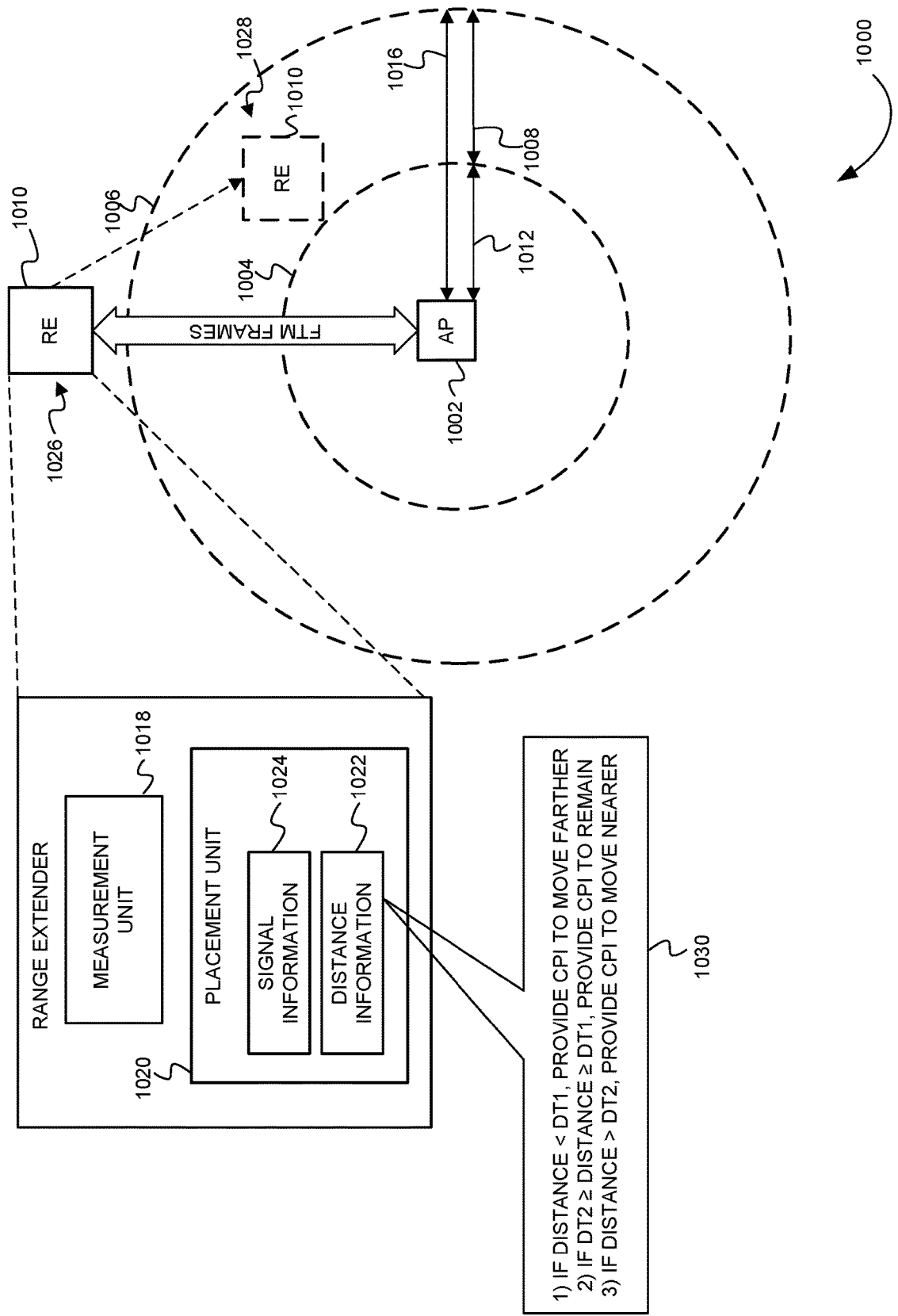
FIG. 10 shows a system diagram of an example WLAN including an RE configured to perform operations for placing the RE based on timing information obtained from an AP.

FIG. 10 shows a system diagram of an example WLAN including an RE configured to perform operations for placing the RE based on RTT information obtained from an AP. The WLAN 1000 shown in FIG. 10 is based on the example WLAN 100 described in FIG. 1. The WLAN 1000 includes an RE 1010 and an AP 1002. Although not shown for simplicity, the WLAN 1000 may include one or more STAs, which may include one or more additional APs and one or more additional non-AP STAs. In some implementations, the WLAN 1000 may be configured as a mesh network, which may include the AP 1002, the RE 1010 and one or more additional APs. The AP 1002 may be a central AP (CAP), where a CAP is an AP that is connected to a gateway device (not shown) that provides connectivity to another network. An RE may be an AP that may extend a coverage area by receiving and retransmitting wireless signals between WLAN devices. An RE may extend the service of the CAP and may be connected to the CAP via wired or wireless links. In some implementations, the RE 1010 may be an AP within the WLAN 1000 that may receive and retransmit wireless signals between the AP 1002 and the STAs (not shown) in the WLAN in order to extend the coverage area of the AP 1002. The RE 1010 and AP 1002 may be example implementations of the AP 102 of FIG. 1, the AP 1902 of FIG. 19A or the STA 1904 of FIG. 19B.

The RE 1010 may include a measurement unit 1018. The measurement unit 1018 may determine distances from the RE 1010 to APs based on RTT information. The measurement unit 1018 may determine a distance from the RE 1010 to the AP 1002 based on RTT information derived from FTM frames exchanged with the AP 1002. The FTM frames may include timestamps that may be used to derive an RTT between the RE 1010 and the AP 1002. Using the RTT, the measurement unit 1018 may determine a first distance between the RE 1010 and the AP 1002.

Initially, the RE 1010 may be at a first location 1026. A first distance threshold may indicate a minimum acceptable distance 1012 between the RE 1010 and the AP 1002. A second distance threshold may indicate a maximum acceptable distance 1016 between the RE 1010 and AP 1002. A distance range 1008 may include a range of acceptable distances between the RE 1010 and AP 1002. The circles 1004 and 1006 illustrate a spatial relationship between the RE 1010 and the minimum acceptable distance 1012, the maximum acceptable distance 1016 and the distance range 1008. Initially, the RE 1010 is farther than the maximum acceptable distance from the AP 1002 (outside the circle 1006) and outside the range of acceptable distances (not between the circles 1004 and 1006).

The RE 1010 also may include a placement unit 1020. The placement unit 1020 may perform operations for coarse placement of the RE 1010 and operations for fine placement of the RE 1010. For coarse placement, the RE 1010 may compare the first distance from itself to the AP 1002 to the first distance threshold and the second distance threshold to determine whether the RE 1010 is located within the distance range 1008 (between the circles 1004 and 1006). If the RE 1010 is located outside the distance range 1008, the RE 1010 may determine whether it is located inside the minimum acceptable distance (inside the circle 1004). If the RE 1010 is located inside the minimum acceptable distance, the RE 1010 may provide a coarse placement indicator indicating to move the RE 1010 farther from the AP 1002. If the RE 1010 is located outside the maximum acceptable distance (outside the circle 1006), the RE 1010 may provide a coarse placement indicator indicating to move the RE 1010 nearer to the AP 1002.

At the first location 1026, the RE 1010 is farther from the AP 1002 than the maximum acceptable distance. The placement unit 1020 may compare the first distance to the AP 1002 to the first and second distance thresholds and determine that the RE 1010 is farther than the maximum acceptable distance from the AP 1002. In response to determining the RE 1010 is farther than the maximum acceptable distance from the AP 1002, the RE 1010 may provide a coarse placement indicator indicating to move the RE 1010 nearer to the AP 1002.

In response to the coarse placement indicator, the RE 1010 may be relocated to a second location 1028. The RE 1010 may repeat operations for coarse placement until it is located in the distance range 1008. Continuing with coarse placement, the RE 1010 may determine a second distance between itself and the AP 1002, and determine whether it is located in the distance range 1008. At the second location 1028, the RE 1010 is within the distance range 1008. If the RE 1010 is within the distance range, it presents a coarse placement indicator indicating to leave the RE 1010 at its current location.

The placement unit 1020 may include distance information 1022 and signal information 1024. The distance information 1022 may indicate relationships between distances from the RE 1010 to the AP 1002, the distance thresholds and the coarse placement indicators. For example, the relationships 1030 may include:

1) if distance<first distance threshold (shown as DT1 in FIG. 10), provide a coarse placement indicator (shown as CPI in FIG. 10) to move farther from the AP 1002 (see distance information 1030 in FIG. 10);
2) if second distance threshold (shown as DT2 in FIG. 10)≥distance≥first distance threshold (DT1), provide a coarse placement indicator to remain at the location (see distance information 1030 in FIG. 10); and
3) if distance>second distance threshold (DT2), provide a coarse placement indicator to move nearer the AP (see distance information 1030 in FIG. 10).

The distance thresholds and relationships may be configured to expand the coverage area of the AP 1002 and to provide suitable signal strength to the RE 1010. The distance information 1022 may include one or more distance thresholds, coarse placement indicators, and other information suitable for performing coarse placement of the RE 1010.

In some implementations, the RE 1010 also may perform operations for fine placement of the RE 1010. For fine placement, the RE 1010 may provide indications about placing the RE 1010 based on signal strengths. For example, the RE 1010 may obtain an RSSI associated with the AP 1002. The placement unit 1020 may determine a fine placement indicator based on the RSSI, and provide the fine placement indicator to assist in placing the RE 1010 in the environment, as described further in FIG. 11.

Figure 11:
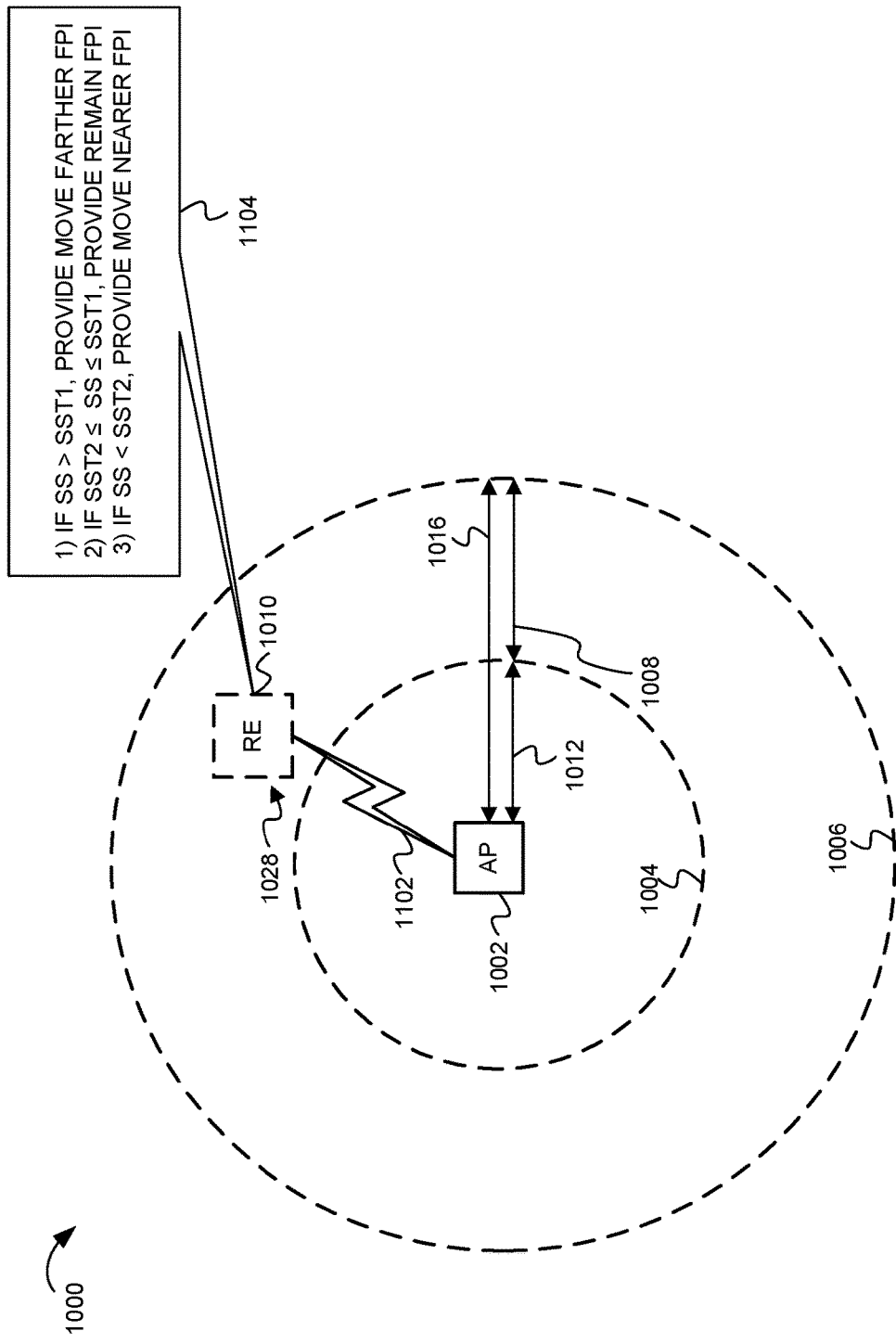
FIG. 11 shows a system diagram of an example WLAN including an RE configured to perform operations for fine placement based on signal strength information obtained from an AP.

FIG. 11 shows a system diagram of an example WLAN including an RE configured to perform operations for fine placement based on signal strength information obtained from an AP. FIG. 11 is described with reference to FIG. 10, and as described in FIG. 10, the WLAN 1000 may include the RE 1010 and the AP 1002.

As shown in FIG. 11, the RE 1010 may be inside the distance range 1008 at location 1028. The distance range 1008 may be the acceptable distance range for the coarse placement of the RE 1010. If inside the distance range 1008, the RE 1010 may perform operations for fine placement. For fine placement, the RE 1010 may determine a signal strength of the AP 1002. The RE 1010 may establish a network association 1102 with the AP 1002 to determine a signal strength for the AP 1002. The signal strength may be represented by an RSSI. The RE 1010 may compare the signal strengths to one or more signal strength thresholds to determine whether the signal strength is too high, too low, or within an acceptable signal strength range.

A first signal strength threshold may indicate a maximum acceptable signal strength from the AP 1002. A second signal strength threshold may indicate a minimum acceptable signal strength from the AP 1002. A signal strength range may indicate a range of acceptable signal strengths from the AP 1002. If the signal strength is greater than the first signal strength threshold, the RE 1010 may provide a fine placement indicator indicating to move farther from the AP 1002. If the signal strength is less than the second signal threshold, the RE 1010 may provide a fine placement indicator indicating to move nearer to the AP 1002. If the signal strength is greater than or equal to the second signal strength threshold and less than or equal to the first signal strength threshold, the RE 1010 may provide a fine placement indicator indicating to leave the RE 1010 at its current location.

As noted, the placement unit 1020 may include signal information 1024. The signal information 1024 may indicate relationships between signal strengths to the AP, the signal strength thresholds and the fine placement indicators. For example, the relationships 1104 may include:

1) if signal strength (shown as SS in FIG. 11) is greater than the first signal strength threshold (shown as SST1), provide a fine placement indicator (shown as FPI) indicating to move farther from the AP 1002;
2) if the signal strength is less than or equal to the first signal strength threshold (SST1) and the signal strength is greater than or equal to the second signal strength threshold (shown as SST2), provide a fine placement indicator indicating to remain at the current location; and
3) if signal strength is less than the second signal strength threshold (SST2), provide a fine placement indicator indicating to move nearer the AP 1002. The signal strength thresholds and relationships may be configured to expand the coverage area of the AP 1002 and to provide suitable signal strength to the RE 1010. The signal information 1024 may include one or more signal strength thresholds, fine placement indicators and other information suitable for performing fine placement of the RE 1010.

Figure 12:
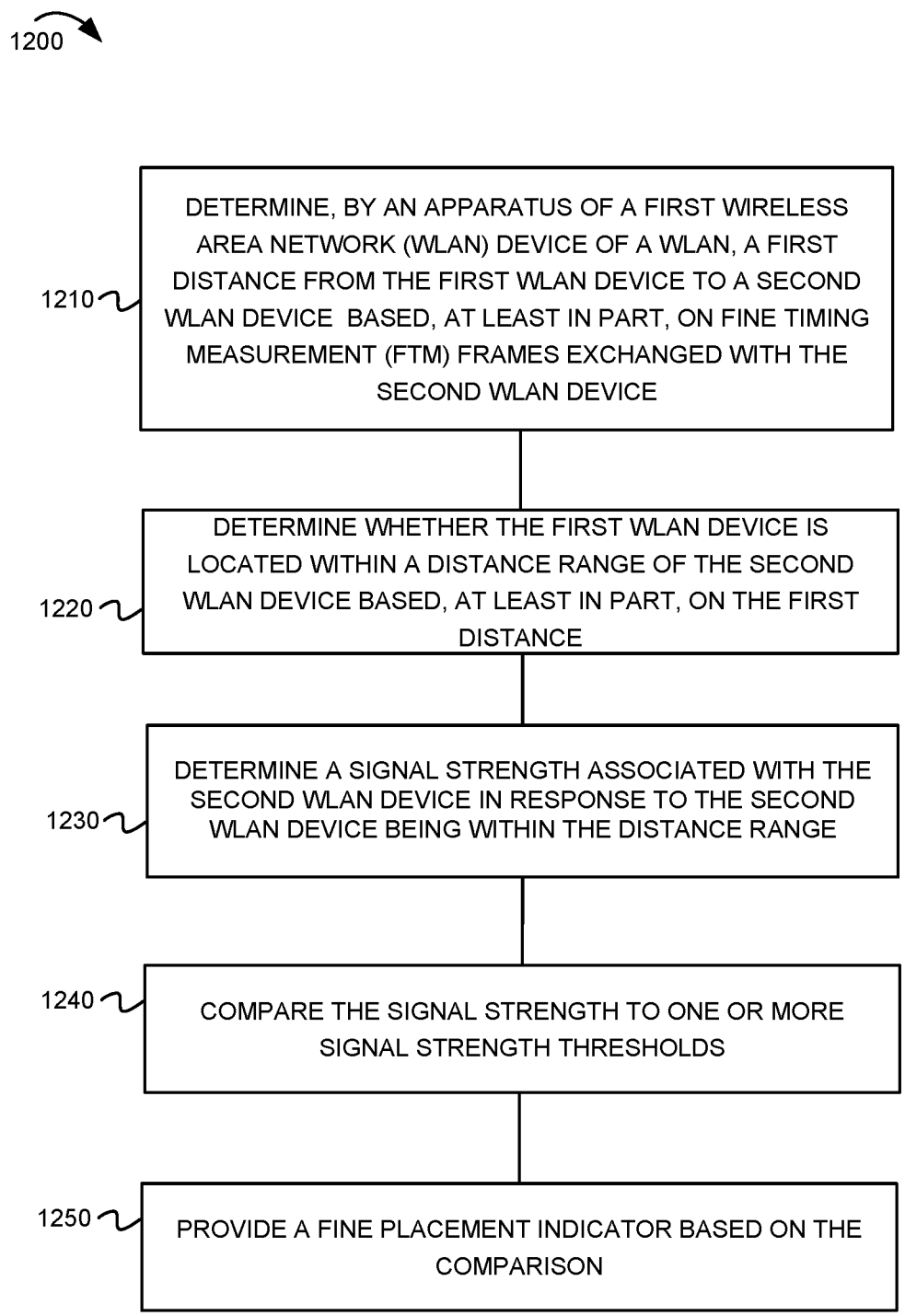
FIG. 12 depicts a process illustrating example operations performed by an apparatus of a first WLAN device for using timing information to place an RE in an environment.

FIG. 12 depicts a process 1200 illustrating example operations performed by an apparatus of a first WLAN device for using RTT information to place an RE in an environment. The process 1200 may be performed by a wireless communication device such as the wireless communication device 1800 or the electronic device 2000 described with reference to FIGS. 18 and 20, respectively. In some implementations, the process 1200 may be performed by a wireless communication device operating as or within an AP, such as one of the APs 102, 310, 312, and 1902 described with reference to FIGS. 1, 3, 4, 5 and 19A, respectively. In some implementations, the process 1200 may be performed by an RE, such as the RE 1010 described with reference to FIGS. 10 and 11, respectively.

At block 1210, the apparatus of the first WLAN device may determine a first distance from the first WLAN device to a second WLAN device based, at least in part, on FTM frames exchanged with the second WLAN device.

At block 1220, the apparatus of the first WLAN device may determine whether the first WLAN device is located within a distance range of the second WLAN device based, at least in part, on the first distance. In some implementations, the apparatus of the first WLAN device can be configured to provide coarse placement assistance. The coarse placement assistance may include a coarse placement indicator.

At block 1230, the apparatus of the first WLAN device may determine a signal strength associated with the second WLAN device in response to the second WLAN device being within the distance range.

At block 1240, the apparatus of the first WLAN device may compare the signal strength to one or more signal strength thresholds.

At block 1250, the apparatus of the first WLAN device may provide a fine placement indicator based on the comparison.

Figure 13:
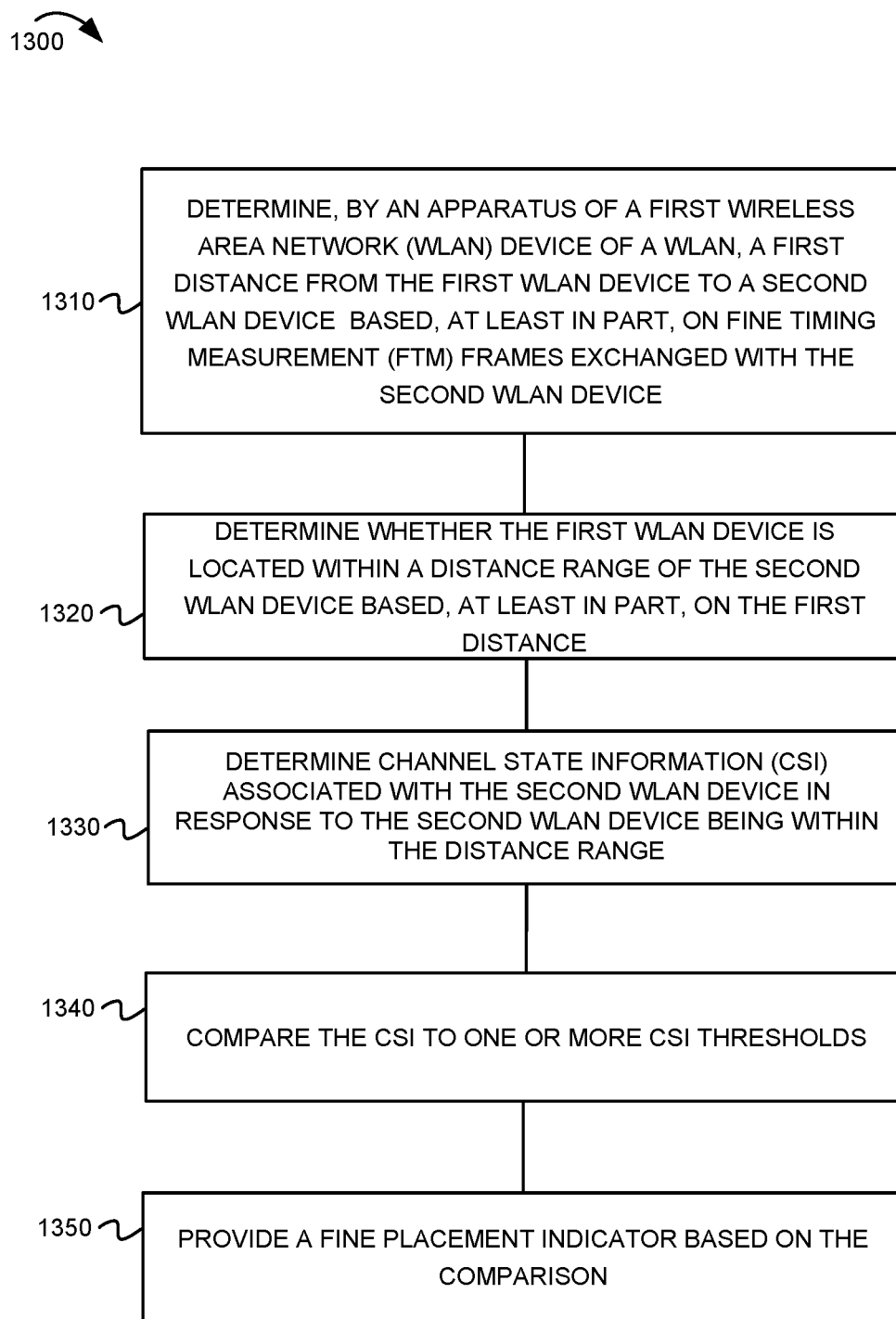
FIG. 13 depicts a process illustrating example operations performed by an apparatus of a first WLAN device for using timing information to place an RE in an environment.

FIG. 13 depicts a process 1300 illustrating example operations performed by an apparatus of a first WLAN device for using RTT information to place an RE in an environment. The process 1300 may be performed by a wireless communication device such as the wireless communication device 1800 or the electronic device 2000 described with reference to FIGS. 18 and 20, respectively. In some implementations, the process 1300 may be performed by a wireless communication device operating as or within an AP, such as one of the APs 102, 310, 312, 1902 and 2000 described with reference to FIGS. 1, 3, 4, 5, 19A and 20, respectively. In some implementations, the process 1300 may be performed by an RE, such as the RE 1010 described with reference to FIGS. 10 and 11, respectively.

At block 1310, the apparatus of the first WLAN device may determine a first distance from the first WLAN device to a second WLAN device based, at least in part, on FTM frames exchanged with the second WLAN device.

At block 1320, the apparatus of the first WLAN device may determine whether the first WLAN device is located within a distance range of the second WLAN device based, at least in part, on the first distance. In some implementations, the apparatus of the first WLAN device can be configured to provide coarse placement assistance. The coarse placement assistance may include a coarse placement indicator.

At block 1330, the apparatus of the first WLAN device may determine channel state information (CSI) associated with the second WLAN device in response to the second WLAN device being within the distance range.

At block 1340, the apparatus of the first WLAN device may compare the CSI to one or more CSI thresholds.

At block 1350, the apparatus of the first WLAN device may provide a fine placement indicator based on the comparison.

Figure 14:
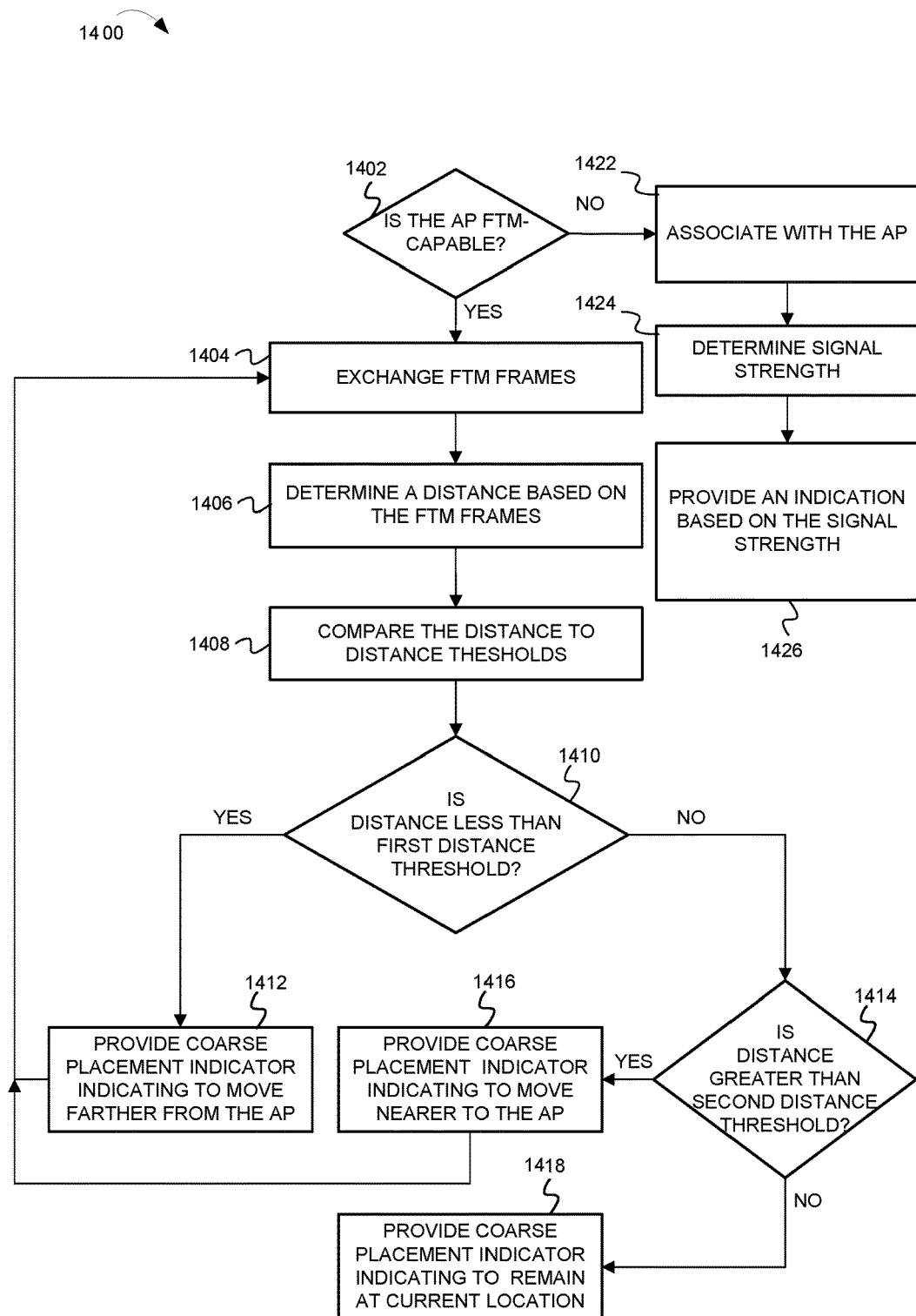
FIG. 14 depicts a process illustrating example operations for coarse placement of an RE in a WLAN that may have an FTM-capable AP.

FIG. 14 depicts a process 1400 illustrating example operations for coarse placement of an RE in a WLAN that may have an FTM-capable AP. For an FTM-capable AP, the RE may use FTM frames in a process for coarse placement of the RE. The process 1400 may be performed by a wireless communication device such as the wireless communication device 1800 or the electronic device 2000 described with reference to FIGS. 18 and 20, respectively. In some implementations, the process 1400 may be performed by a wireless communication device operating as or within an AP, such as the RE 1010 described with reference to FIGS. 10 and 11, respectively. The description of the flowchart 1400 will refer to the RE 1010 and other devices described with reference to FIG. 10.

At block 1402, the RE 1010 may determine whether the AP 1002 is FTM-capable. The AP 1002 may receive a capabilities element indicating the RE 1010 is capable of acting as an FTM responder. The capabilities element may be included in a beacon or in information exchanged during association. If the RE 1010 receives an information element indicating the AP 1002 is capable of acting as an FTM responder, the AP 1002 is FTM-capable. Otherwise, the RE is not FTM-capable. If the AP 1002 is FTM-capable, operations continue at block 1404. Otherwise, operations continue at block 1422.

At block 1404, the RE 1010 may exchange FTM frames with the AP 1002. The FTM frames may include timestamps or other timing information that may be used to derive an RTT from the RE to the AP. The RE 1010 may exchange the FTM frames without creating a network association with the AP 1002.

At block 1406, the RE 1010 may determine a distance based on the FTM frames. The RE 1010 may determine the distance based on the RTT associated with the FTM frames.

At block 1408, the RE 1010 may compare the distance to one or more distance thresholds. For example, the RE 1010 may compare the distance to two distance thresholds. A first distance threshold may indicate a minimum distance between the RE 1010 and the AP 1002. The second distance threshold may indicate a maximum distance between the RE 1010 and the AP 1002. The first and second distance thresholds together may indicate a distance range in which to place the RE 1010. If the distance (determined at block 1406) is less than the first distance threshold (at block 1410), operations continue at block 1412. If the first distance is greater than the first distance threshold (at block 1410), operations continue at block 1414.

At block 1412, the RE 1010 may provide a coarse placement indicator indicating to move the RE farther from the AP 1002. The operations continue at block 1404. The RE 1010 may repeat operations for coarse placement until the RE 1010 is within the distance range of the AP 1002.

At block 1414, the RE 1010 may determine whether the distance (determined at block 1406) is greater than the second distance threshold. For example, the second distance threshold may indicate a maximum distance between the RE 1010 and the AP 1002. The RE 1010 may determine whether the distance between the RE 1010 and the AP 1002 is greater than the maximum distance. If the distance is greater than the second distance threshold, operations continue at block 1416. If the distance is not greater than the second distance threshold, operations continue at block 1418.

At block 1416, the RE 1010 may provide a coarse placement indicator indicating to move nearer to the AP. For example, the RE 1010 may provide the coarse placement indicator by flashing a light indicating to move the RE 1010 nearer to the AP 1002. Coarse placement indicators may include or be associated with any suitable media, such as audio, sound, video and flashing lights. The RE 1010 may present the media. The RE 1010 may cause presentation of the media by providing the coarse placement indicator to another device, such as a WLAN device or any suitable device that is not connected to the WLAN 1000. The RE 1010 may repeat operations for coarse placement until the RE 1010 is within the distance range of the AP 1002.

At block 1418, the RE 1010 may provide a coarse placement indicator indicating to remain at the current location. For example, the RE 1010 may be located within a distance range of the AP 1002. Because the RE 1010 is within the distance range, the RE 1010 may provide a coarse placement indicator indicating to remain at the current location.

Referring back to block 1402, if the AP 1002 is not FTM-capable, operations continue at block 1422. If the AP is not FTM-capable, the RE 1010 does not perform coarse placement of the RE 1010 based on RTT information received from the AP 1002. Instead, the RE 1010 may use signal strength to assist in placing the RE 1010 in the environment. At block 1422, the RE 1010 may create a network association with the AP 1002.

At block 1424, the RE 1010 may determine the signal strength of the AP 1002. The RE 1010 may determine an RSSI for the AP 1002.

At block 1426, the RE 1010 may provide an indication about placing the RE 1010 based on the signal strength. If signal strength is too high, the RE 1010 may provide an indication to move farther from the AP 1002. If the signal strength is too low, the RE 1010 may provide an indication to move closer to the AP 1002. If the signal strength is within a signal strength range, the RE 1010 may provide an indication indicating to remain at its current location. Although the operations at blocks 1422, 1424 and 1426 relate to signal strength and placing the RE 1010, those operations may differ from operations for fine placement of the RE 1010 described herein.

Figure 15:
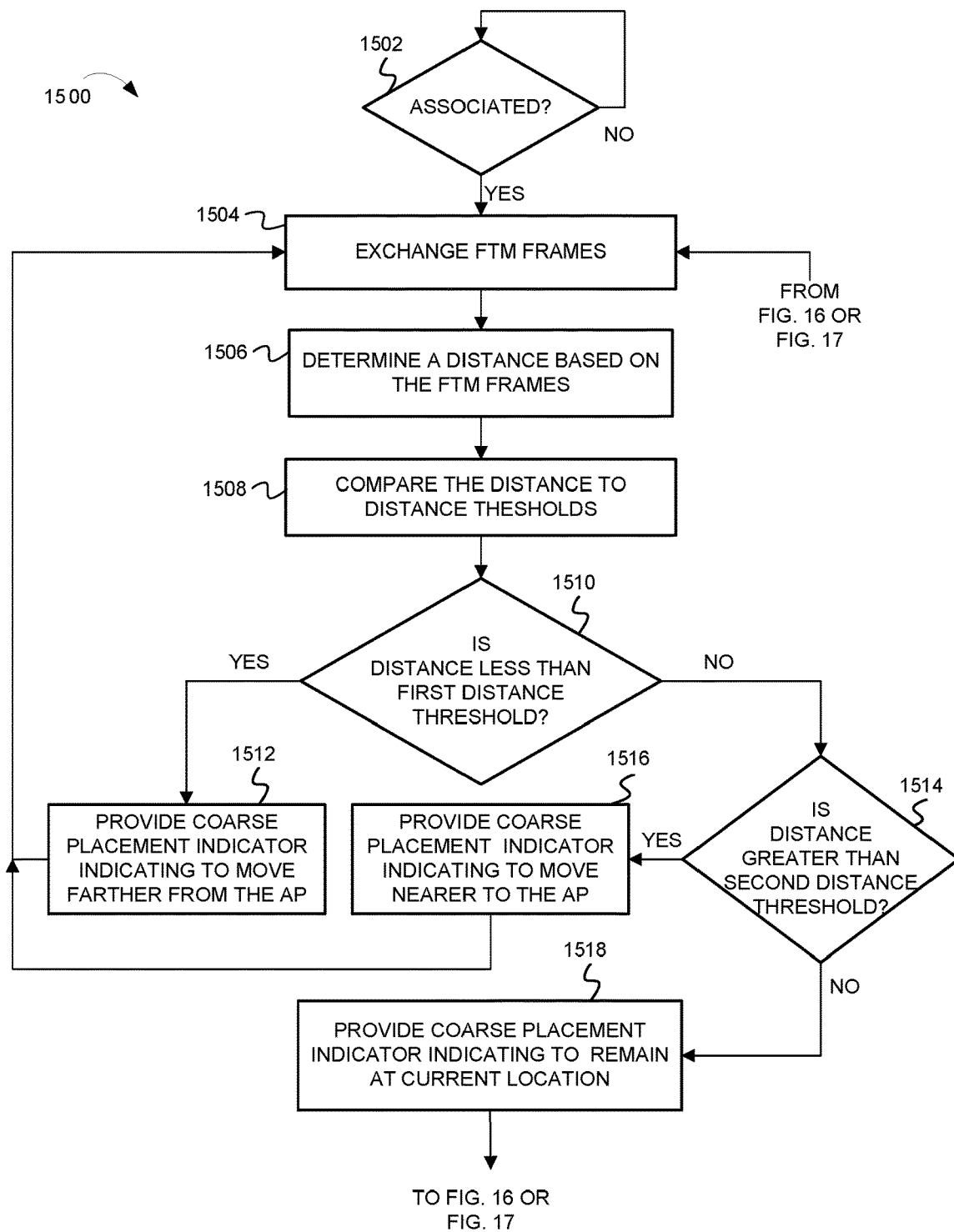
FIG. 15 depicts example operations of a process for coarse and fine placement of an RE in a WLAN that includes one or more FTM-capable APs.

FIG. 15 depicts example operations of a process 1500 for coarse and fine placement of an RE in a WLAN that includes one or more FTM-capable APs. The process 1500 may be performed by a wireless communication device such as the wireless communication device 1800 or the electronic device 2000 described with reference to FIGS. 18 and 20, respectively. In some implementations, the process 1500 may be performed by a wireless communication device operating as or within an AP, such as the RE 1010 described with reference to FIGS. 10 and 11, respectively. The description of the flowchart 1500 will refer to the RE 1010 and other devices described with reference to FIG. 10.

At block 1502, the RE 1010 may determine whether it has established a network association with the AP 1002. If no network association has been established, operations continue at block 1502. If the RE 1010 has established a network association with the AP 1002, the RE 1010 may have received a capabilities element indicating the AP 1002 is capable of acting as an FTM responder. If the RE 1010 has established a network association with the AP 1002, the operations continue at block 1504.

At block 1504, the RE 1010 may exchange FTM frames with the AP 1002. The FTM frames may include timestamps or other timing information that may be used to derive an RTT from the RE 1010 to the AP 1002.

At block 1506, the RE 1010 may determine a distance based on the FTM frames. The RE may determine the distance based on the RTT associated with the FTM frames.

At block 1508, the RE 1010 may compare the distance to two distance thresholds. A first distance threshold may indicate a minimum distance between the RE 1010 and the AP 1002. The second distance threshold may indicate a maximum distance between the RE 1010 and the AP 1002. The first and second distance thresholds together may indicate a distance range in which to place the RE 1010. If the distance (determined at block 1506) is less than the first distance threshold, operations continue at block 1512. If the first distance is greater than the first distance threshold, the operations continue at block 1514.

At block 1512, the RE 1010 may provide a coarse placement indicator to move the RE 1010 farther from the AP 1002. The operations continue at block 1504. The RE 1010 may repeat operations for coarse placement until the RE 1010 is within the distance range of the AP 1002.

At block 1514, the RE 1010 may determine whether the distance (determined at block 1506) is greater than the second distance threshold. For example, the second distance threshold may indicate a maximum distance between the RE 1010 and the AP 1002. The RE 1010 may determine whether the distance between the RE 1010 and the AP 1002 is greater than the maximum distance. If the distance is greater than the second distance threshold, operations continue at block 1516. If the distance is not greater than the second distance threshold, the operations continue at block 1518.

At block 1516, the RE 1010 may provide a coarse placement indicator indicating to move nearer to the AP. For example, the RE 1010 may provide the coarse placement indicator by flashing a light indicating to move the RE 1010 nearer to the AP 1002. The RE 1010 may repeat operations for coarse placement until the RE 1010 is within the distance range of the AP 1002.

At block 1518, the RE 1010 may provide a coarse placement indicator indicating to remain at the current location. For example, the RE 1010 may be located within a distance range of the AP 1002. Because the RE 1010 is within the distance range, the RE 1010 may provide a coarse placement indicator indicating to remain at the current location. The process may continue at block 1622 which is shown in FIG. 16.

Figure 16:
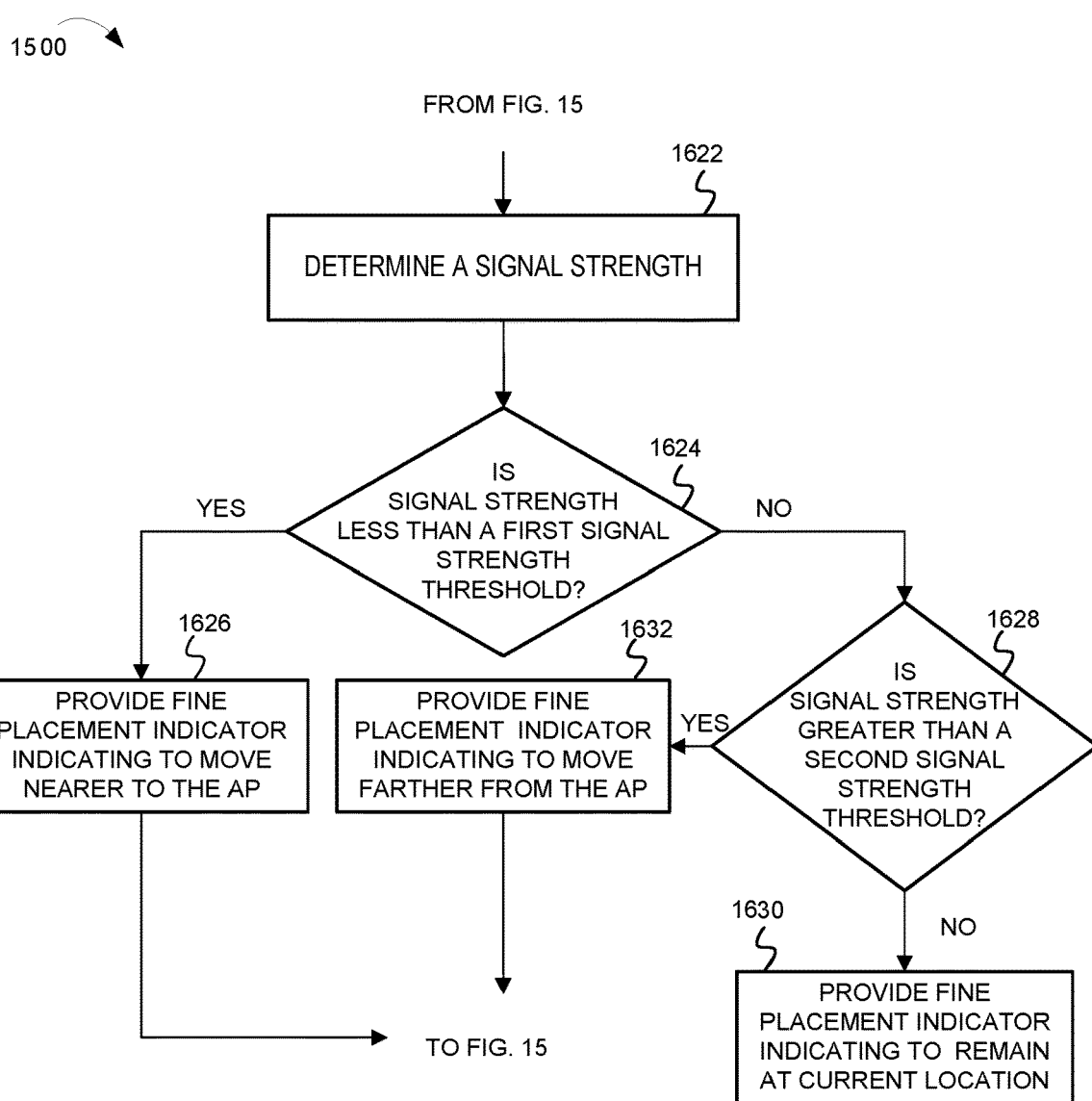
FIG. 16 illustrates additional example operations of the process for coarse and fine placement of an RE in a WLAN that includes one or more FTM-capable APs.

FIG. 16 illustrates additional example operations of the process 1500 for coarse and fine placement of an RE in a WLAN that includes one or more FTM-capable APs. From block 1518 (shown in FIG. 15), operations may continue at block 1622.

At block 1622, the RE 1010 may determine a signal strength associated with the AP 1002. For example, the RE 1010 may determine an RSSI for the AP 1002.

At block 1624, the RE 1010 may determine whether signal strength is less than a first signal strength threshold. The first signal strength threshold may indicate a minimum signal strength with respect to the AP 1002. If the signal strength is less than the first signal strength threshold, operations continue at block 1626. Otherwise, the operations continue at block 1628.

At block 1628, the RE 1010 may determine whether the signal strength is greater than a second signal strength threshold. The second signal strength threshold may indicate a maximum signal strength with respect to the AP 1002. If the signal strength is greater than the second signal strength threshold, the operations continue at block 1632. If the signal strength is less than the second signal strength threshold, the operations continue at block 1630.

At block 1632, the RE 1010 may provide a fine placement indicator indicating to move farther from to the AP 1002. Operations continue at block 1504 (shown in FIG. 15).

At block 1630, the RE 1010 may provide a fine placement indicator indicating to remain at the current location. For operations to arrive at block 1630, the signal strength is within a signal strength range greater than or equal to the minimum signal strength and less than or equal to the maximum signal strength. Because the signal strength is within the signal strength range, the RE 1010 may provide the fine placement indicator indicating to remain at the current location.

Referring back to block 1624, if the signal strength is less than the first signal strength threshold, the operations continue at block 1626. At block 1626, the RE 1010 may provide a fine placement indicator indicating to move nearer to the AP 1002. The operations may continue at block 1504 (shown in FIG. 15).

Figure 17:
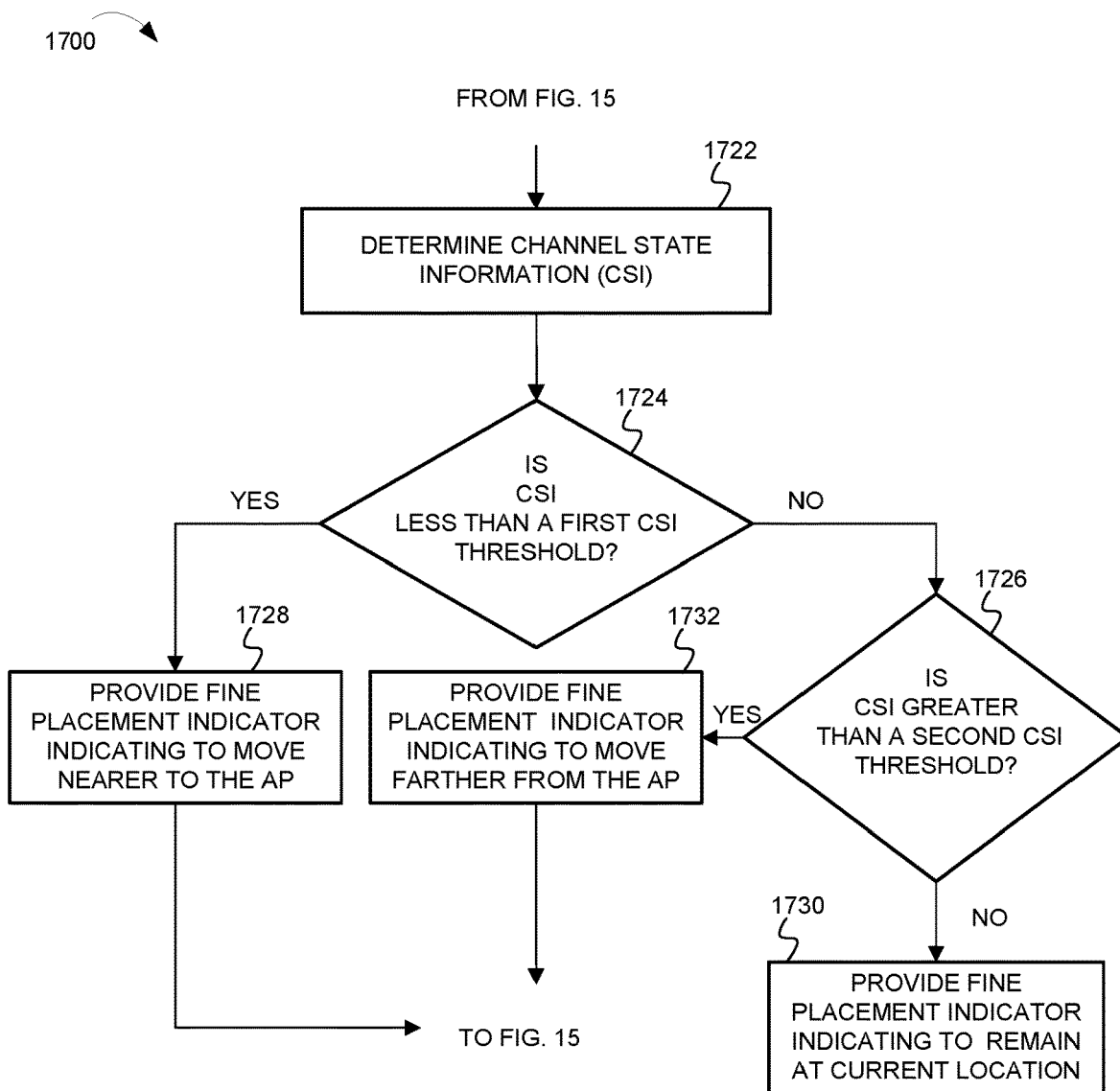
FIG. 17 depicts example operations of a process or fine placement of an RE in a WLAN using channel state information (CSI).

FIG. 17 depicts example operations of a process 1700 for coarse and fine placement of an RE in a WLAN using channel state information (CSI). The process 1700 may be performed by a wireless communication device such as the wireless communication device 1800 or the electronic device 2000 described with reference to FIGS. 18 and 20, respectively. In some implementations, the process 1700 may be performed by a wireless communication device operating as or within an AP, such as the RE 1010 described with reference to FIGS. 10 and 11, respectively. The description of the flowchart 1700 will refer to the RE 1010 and other devices described with reference to FIG. 10.

In some implementations, the RE 1010 may perform operations for coarse placement shown in FIG. 15. After performing block 1518, the RE 1010 may perform the process 1700, which begins at block 1722. In the process 1700, the RE 1010 may use CSI to determine a fine placement in an environment.

At block 1722, the RE 1010 may determine the CSI from communications received from the AP 1002. The CSI information may be instantaneous CSI or short-term CSI. In some implementations, the RE 1010 may estimate the CSI from communications received from the AP 1002 on a per subcarrier basis, such as on a per Orthogonal Frequency Division Multiplexing (OFDM) subcarrier basis. The CSI determined by the receiving device (such as the RE 1010) also may be referred to as a Receiver CSI (or CSIR). The CSI may indicate channel properties of a communication channel between the AP 1002 and the RE 1010 on a per subcarrier basis. For example, the CSI may indicate how signals propagate from the AP 1002 to the RE 1010 and may represent the combined effects of scattering, fading, and power decay over the distance between the AP 1002 and the RE 1010. In some implementations, the CSI may indicate a CSI amplitude on a per subcarrier basis. The CSI amplitude may indicate the signal strength on a per subcarrier basis. In some implementations, the CSI also may indicate a CSI phase on a per subcarrier basis.

At block 1724, the RE 1010 may determine whether the CSI is less than a first CSI threshold. In some implementations, the CSI may be the CSI amplitude and the first CSI threshold may be a first CSI amplitude threshold. In some implementations, the CSI may be an aggregate of the CSI amplitudes derived on a per subcarrier basis, which may be referred to as an aggregate CSI amplitude. For example, the RE 1010 may determine the aggregate CSI amplitude by determining an average of the CSI amplitudes derived on a per subcarrier basis. As another example, the RE 1010 may determine the aggregate CSI by determining an average after a sum of the squared values of each CSI amplitude derived on a per subcarrier basis. The first CSI amplitude threshold may indicate the minimum aggregate CSI amplitude. In some implementations, the RE 1010 may compare the aggregate CSI amplitude to the first CSI amplitude threshold to determine whether the aggregate CSI amplitude is less than the first CSI amplitude threshold. If the CSI is less than the first CSI threshold, the flow continues at block 1728. Otherwise, the flow continues at block 1726.

At block 1726, the RE 1010 may determine whether the CSI is greater than a second CSI threshold. In some implementations, the second CSI threshold may be a second CSI amplitude threshold. The second CSI amplitude threshold may indicate the maximum aggregate CSI amplitude. In some implementations, the RE 1010 may compare the aggregate CSI amplitude to the second CSI amplitude threshold to determine whether the aggregate CSI amplitude is greater than the second CSI amplitude threshold. If the CSI is greater than the second CSI threshold, the operations continue at block 1732. If the signal strength is less than the second signal strength threshold, the operations continue at block 1730.

At block 1732, the RE 1010 may provide a fine placement indicator indicating to move farther from the AP 1002. Operations continue at block 1504 (shown in FIG. 15).

At block 1730, the RE 1010 may provide a fine placement indicator indicating to remain at the current location. For operations to arrive at block 1730, the CSI may be within a CSI range that is greater than or equal to the minimum CSI and less than or equal to the maximum CSI. Because the CSI is within the CSI range, the RE 1010 may provide the fine placement indicator indicating to remain at the current location.

Referring back to block 1724, if the CSI is less than the first CSI threshold, the operations continue at block 1728. At block 1728, the RE 1010 may provide a fine placement indicator indicating to move nearer to the AP 1002. The operations may continue at block 1504 (shown in FIG. 15).

In some implementations, the network 1000 may leverage the operations related to CSI from a transmitting device (CSIT) and CSIR to provide placement assistance for the AP 1002.

In some implementations, the RE 1010 also may use CSIT in the process for providing placement guidance. The RE 1010 may obtain CSIT information from the AP 1002 (such as at block 1722). In some implementations, the RE 1010 may compare CSIT to CSIR to determine information related to one or more of scattering, fading and power decay (such as at block 1724). This comparison of CSIT to CSIR may provide a value greater than, equal to or less than a first CSI threshold. If the value is less than the first CSI threshold (such as at block 1724), the RE 1010 may provide a fine placement indicator to move nearer to the AP 1002 (such as at block 1728) or the RE 1010 may make further comparison to a second CSI threshold (such as at block 1726). If the comparison of CSIT to CSIR is greater than the second CSI threshold, the RE 1010 may provide a fine placement indicator to remain at its current location (such as block 1730). Otherwise, the RE may provide a fine placement indicator to move farther from the AP 1002 (such as at block 1732).

Figure 18:
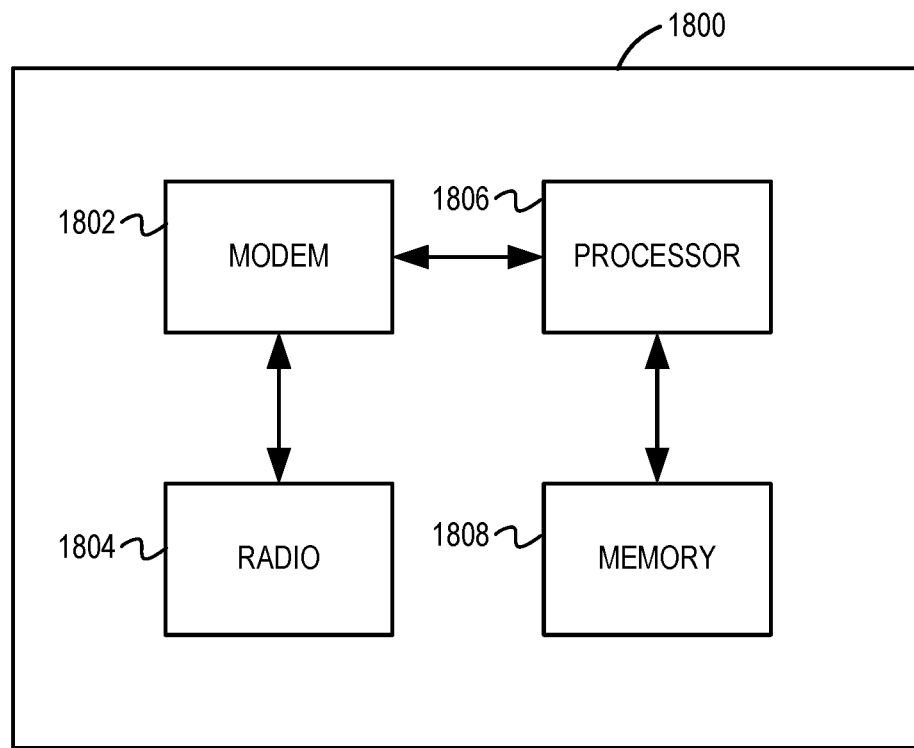
FIG. 18 shows a block diagram of an example wireless communication device.

FIG. 18 shows a block diagram of an example wireless communication device 1800. In some implementations, the wireless communication device 1800 can be an example of a device for use in a STA such as one of the STAs 104 described herein. In some implementations, the wireless communication device 1800 can be an example of a device for use in an AP such as the AP 102 described herein. The wireless communication device 1800 may be generally referred to as an apparatus or a wireless communication apparatus. The wireless communication device 1800 is capable of transmitting (or outputting for transmission) and receiving wireless communications (for example, in the form of wireless packets). For example, the wireless communication device 1800 can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11 ay, 802.11ax, 802.11az, 802.11ba and 802.11be, in addition to future 802.11 standards.

The wireless communication device 1800 can be, or can include, a chip, system on chip (SoC), chipset, package or device that includes one or more modems 1802, for example, a Wi-Fi (IEEE 802.11 compliant) modem. In some implementations, the one or more modems 1802 (collectively "the modem 1802") additionally include a WWAN modem (for example, a 3GPP 4G LTE or 5G compliant modem). In some implementations, the wireless communication device 1800 also includes one or more radios 1804 (collectively "the radio 1804"). In some implementations, the wireless communication device 1800 further includes one or more processors, processing blocks or processing elements (collectively "the processor 1806") and one or more memory blocks or elements (collectively "the memory 1808").

The modem 1802 can include an intelligent hardware block or device such as, for example, an application-specific integrated circuit (ASIC) among other possibilities. The modem 1802 is generally configured to implement a PHY layer. For example, the modem 1802 is configured to modulate packets and to output the modulated packets to the radio 1804 for transmission over the wireless medium. The modem 1802 is similarly configured to obtain modulated packets received by the radio 1804 and to demodulate the packets to provide demodulated packets. In addition to a modulator and a demodulator, the modem 1802 may further include digital signal processing (DSP) circuitry, automatic gain control (AGC), a coder, a decoder, a multiplexer and a demultiplexer. For example, while in a transmission mode, data obtained from the processor 1806 is provided to a coder, which encodes the data to provide encoded bits. The encoded bits are mapped to points in a modulation constellation (using a selected MCS) to provide modulated symbols. The modulated symbols may be mapped to a number $N_{SS}$ of spatial streams or a number $N_{STS}$ of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 1804. In implementations involving beamforming, the modulated symbols in the respective spatial streams are precoded via a steering matrix prior to their provision to the IFFT block.

While in a reception mode, digital signals received from the radio 1804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 1806) for processing, evaluation or interpretation.

The radio 1804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 1800 can include, or be coupled with, multiple transmit antennas (each with a corresponding transmit chain) and multiple receive antennas (each with a corresponding receive chain). The symbols output from the modem 1802 are provided to the radio 1804, which transmits the symbols via the coupled antennas. Similarly, symbols received via the antennas are obtained by the radio 1804, which provides the symbols to the modem 1802. In some implementations, the radio 1804 and the one or more antennas may form one or more network interfaces (which also may be referred to as "interfaces").

The processor 1806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 1806 processes information received through the radio 1804 and the modem 1802, and processes information to be output through the modem 1802 and the radio 1804 for transmission through the wireless medium. For example, the processor 1806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 1806 may generally control the modem 1802 to cause the modem to perform various operations described above.

The memory 1808 can include tangible storage media such as random-access memory (RAM) or read-only memory (ROM), or combinations thereof. The memory 1808 also can store non-transitory processor- or computer-executable software (SW) code containing instructions that, when executed by the processor 1806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

In some implementations, the wireless communication device 1800 may include a measurement unit (not shown) and a steering unit (not shown). The measurement unit and the steering unit may be similar to the measurement unit 306 and the steering unit 308 described with reference to FIG. 3 and may implement any of the operation for location aware steering described herein.

In some implementations, the wireless communication device 1800 may include a measurement unit (not shown) and a placement unit (not shown) similar to the measurement unit 1018 and placement unit 1020 described with reference to FIG. 10 and may implement any of the operations for coarse and fine placement described herein.

In some implementations, the measurement unit, placement unit and steering unit may be implemented by the processor 1806 and the memory 1808. The memory 1808 may include computer instructions executable by the processor 1806 to implement the functionality of the sounding signal unit. Any of these functionalities may be partially (or entirely) implemented in hardware or on the processor 1806.

In some implementations, the processor 1806 and the memory 1808 of the wireless communication device 1800 may be referred to as a processing system. A processing system may generally refer to a system or series of machines or components that receives inputs and processes the inputs to produce a set of outputs (which may be passed to other systems or components of, for example, one of the STAs 104 or one of the APs 102). In some implementations, the processing system may include the processor 1806, the memory 1808, and one or more other components of the wireless communication device 1800, such as the modem 1802.

In some implementations, the processing system of a STA 104 may interface with other components of the STA 104, and may process information received from other components (such as inputs or signals), output information to other components, etc. For example, a chip or modem of the STA 104 (such as the wireless communication device 1800) may include a processing system and one or more interfaces. The one or more interfaces may include a first interface to receive or obtain information, and a second interface to output, transmit or provide information. In some cases, the first interface may refer to an interface between the processing system of the chip or modem and a receiver, such that the STA 104 may receive information or signal inputs, and the information may be passed to the processing system. In some cases, the second interface may refer to an interface between the processing system of the chip or modem and a transmitter, such that the STA 104 may transmit information output from the chip or modem. A person having ordinary skill in the art will readily recognize that the second interface also may obtain or receive information or signal inputs, and the first interface also may output, transmit or provide information.

In some implementations, the processing system of an AP 102 may interface with other components of the AP 102, and may process information received from other components (such as inputs or signals), output information to other components, etc. For example, a chip or modem of the AP 102 (such as the wireless communication device 1800) may include a processing system, a first interface to receive or obtain information, and a second interface to output, transmit or provide information. In some cases, the first interface may refer to an interface between the processing system of the chip or modem and a receiver, such that the AP 102 may receive information or signal inputs, and the information may be passed to the processing system. In some cases, the second interface may refer to an interface between the processing system of the chip or modem and a transmitter, such that the AP 102 may transmit information output from the chip or modem. A person having ordinary skill in the art will readily recognize that the second interface also may obtain or receive information or signal inputs, and the first interface also may output, transmit or provide information.

Figure 19B:
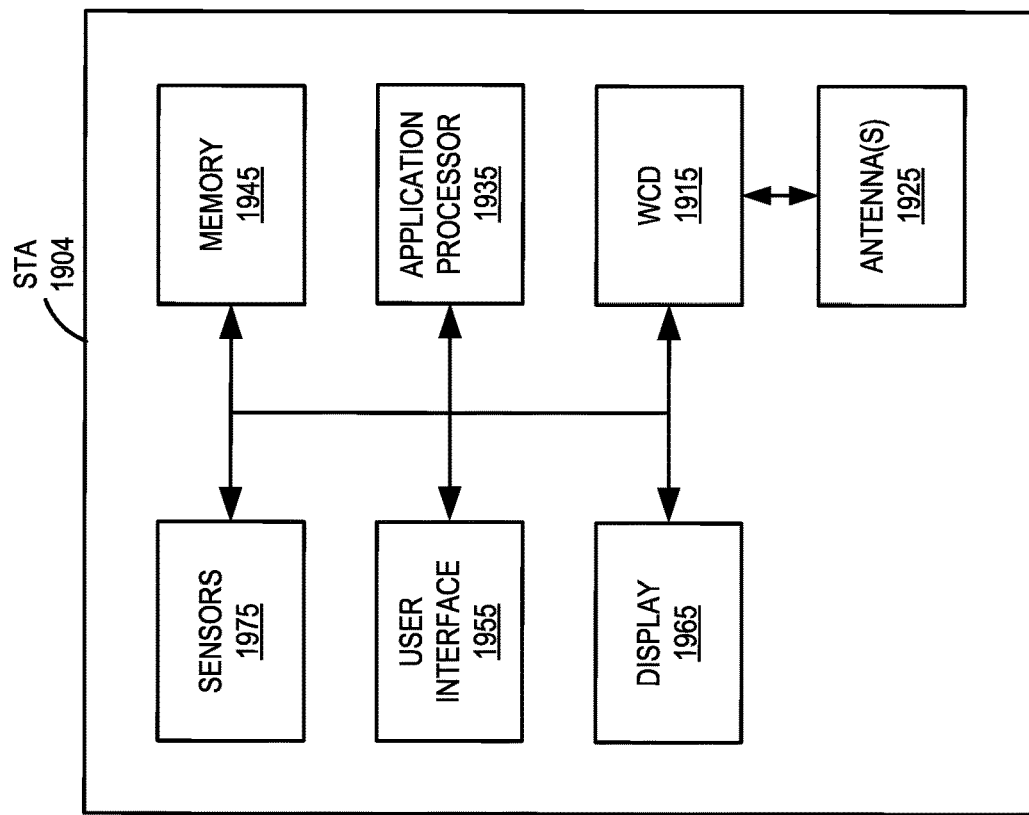
FIG. 19B shows a block diagram of an example STA.
Figure 19A:
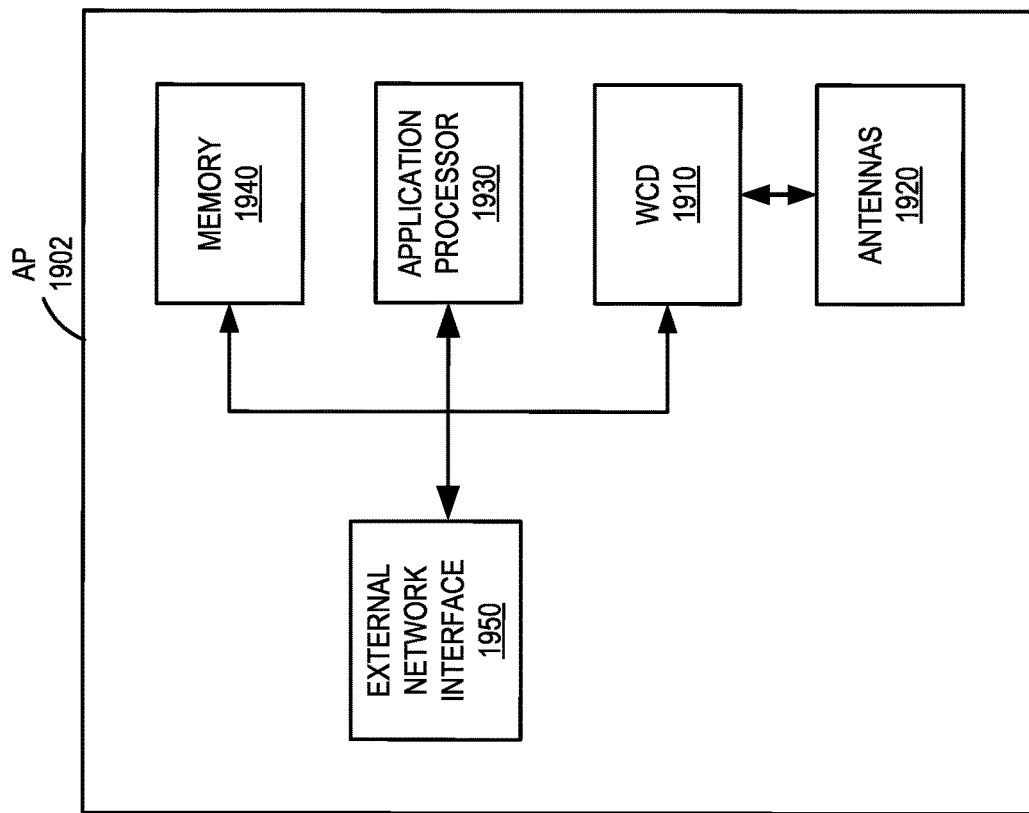
FIG. 19A shows a block diagram of an example AP.

FIG. 19A shows a block diagram of an example AP 1902. For example, the AP 1902 can be an example implementation of the AP 102 described herein. The AP 1902 includes a wireless communication device (WCD) 1910. For example, the wireless communication device 1910 may be an example implementation of the wireless communication device 1800 described with reference to FIG. 18. The AP 1902 also includes multiple antennas 1920 coupled with the wireless communication device 1910 to transmit and receive wireless communications. In some implementations, the AP 1902 additionally includes an application processor 1930 coupled with the wireless communication device 1910, and a memory 1940 coupled with the application processor 1930. The AP 1902 further includes at least one external network interface 1950 that enables the AP 1902 to communicate with a core network or backhaul network to gain access to external networks including the Internet. For example, the external network interface 1950 may include one or both of a wired (for example, Ethernet) network interface and a wireless network interface (such as a WWAN interface). Ones of the aforementioned components can communicate with other ones of the components directly or indirectly, over at least one bus. The AP 1902 further includes a housing that encompasses the wireless communication device 1910, the application processor 1930, the memory 1940, and at least portions of the antennas 1920 and external network interface 1950.

FIG. 19B shows a block diagram of an example STA 1904. For example, the STA 1904 can be an example implementation of the STA 104 described herein. The STA 1904 includes a wireless communication device 1915. For example, the wireless communication device 1915 may be an example implementation of the wireless communication device 1800 described with reference to FIG. 9. The STA 1904 also includes one or more antennas 1925 coupled with the wireless communication device 1915 to transmit and receive wireless communications. The STA 1904 additionally includes an application processor 1935 coupled with the wireless communication device 1915, and a memory 1945 coupled with the application processor 1935. In some implementations, the STA 1904 further includes a user interface (UI) 1955 (such as a touchscreen or keypad) and a display 1965, which may be integrated with the UI 1955 to form a touchscreen display. In some implementations, the STA 1904 may further include one or more sensors 1975 such as, for example, one or more inertial sensors, accelerometers, temperature sensors, pressure sensors, or altitude sensors. Ones of the aforementioned components can communicate with other ones of the components directly or indirectly, over at least one bus. The STA 1904 further includes a housing that encompasses the wireless communication device 1915, the application processor 1935, the memory 1945, and at least portions of the antennas 1925, UI 1955, and display 1965.

Figure 20:
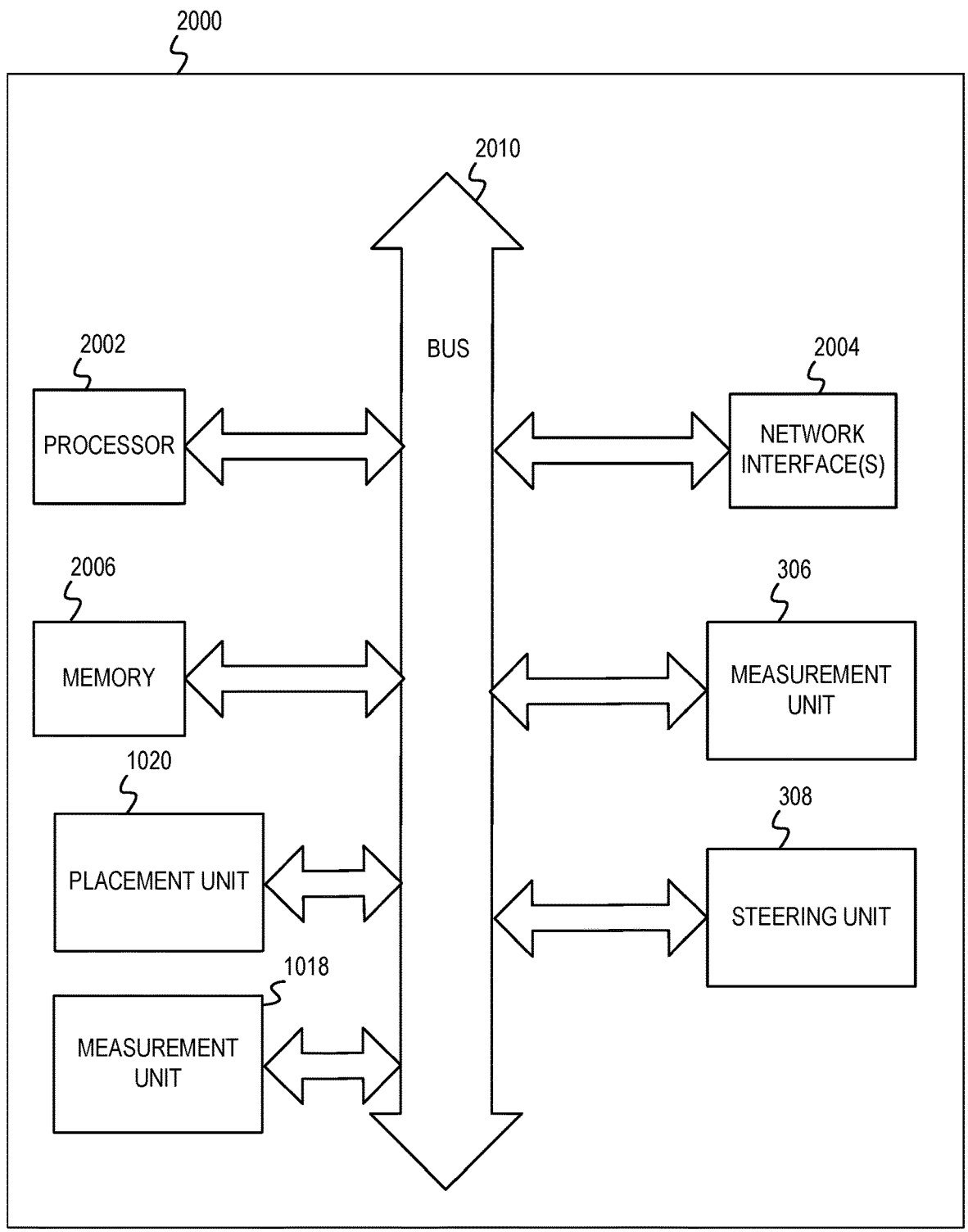
FIG. 20 shows a block diagram of an example electronic device for implementing aspects of this disclosure.

FIG. 20 shows a block diagram of an example electronic device for implementing aspects of this disclosure. In some implementations, the electronic device 2000 may be one of an AP (including any of the APs described herein), a range extender, a station (including any of the STAs described herein) or other electronic systems. The electronic device 2000 can include a processor 2002 (possibly including multiple processors, multiple cores, multiple nodes, or implementing multi-threading, etc.). The electronic device 2000 also can include a memory 2006. The memory 2006 may be system memory or any one or more of the possible realizations of computer-readable media described herein. In some implementations, the processor 2002 and the memory 2006 may be referred to as the processing system. The electronic device 2000 also can include a bus 2010 (such as PCI, ISA, PCI-Express, HyperTransport®, InfiniBand®, NuBus,® AHB, AXI, etc.), and one or more network interfaces 2004 (which also may be referred to as "interfaces") that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 2000 may support multiple network interfaces—each of which is configured to couple the electronic device 2000 to a different communication network.

The electronic device 2000 may include a measurement unit 306 and a steering unit 308, which may implement operations for location aware steering as described herein. In some implementations, the measurement unit 306 and the steering unit 308 may be distributed within the processor 2002 and the memory 2006. The measurement unit 306 and the steering unit 308 may perform some or all the location aware steering operations described herein in this disclosure.

The electronic device 2000 may include a measurement unit 1018, a placement unit 1020, which may implement operations for coarse placement and fine placement of an RE as described herein. In some implementations, the measurement unit 1018 and the placement unit 1020 may be distributed within the processor 2002 and the memory 2006.

The memory 2006 can include computer instructions executable by the processor 2002 to implement the functionality of the implementations described in FIGS. 1-20. Any of these functionalities may be partially (or entirely) implemented in hardware and or on the processor 2002. For example, the functionality may be implemented with an application specific integrated circuit, in logic implemented in the processor 2002, in a co-processor on a peripheral device or card, etc. Further, realizations may include fewer or additional components not illustrated in FIG. 20 (such as video cards, audio cards, additional network interfaces, peripheral devices, etc.). The processor 2002, the memory 2006, and the network interface 2004 are coupled to the bus 2010. Although illustrated as being coupled to the bus 2010, the memory 2006 may be coupled to the processor 2002.

FIGS. 1-20 and the operations described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray' disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the Figures, and indicate relative positions corresponding to the orientation of the Figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

In some aspects, a first method for wireless communication in a WLAN performed by an apparatus of a first AP may include determining whether a WLAN device is capable of exchanging FTM frames. The first method may include, in response to determining the WLAN device is capable of exchanging FTM frames, determining a first distance from the first AP to the WLAN device based, at least in part, on the FTM frames exchanged with the WLAN device. The first method may include, in response to determining the WLAN device is capable of exchanging FTM frames, obtaining an indication of a second distance between a second AP and the WLAN device. The first method may include, in response to determining the WLAN device is capable of exchanging FTM frames, determining a location of the WLAN device based, at least in part, on the first distance and the second distance. The first method may include, in response to determining the WLAN device is capable of exchanging FTM frames, steering the WLAN device to the second AP based, at least in part, on the location of the WLAN device.

The first method may include additional aspects, such as any single aspect or any combination of aspects described below or in connection with one or more other methods described elsewhere herein.

In a first aspect, the location is a relative location of the WLAN device with respect to the first AP and the second AP.

In a second aspect, alone or in combination with the first aspect, the first method may include determining a signal strength of a signal received from the WLAN device. In the second aspect, the first method may include determining that the signal strength is less than a signal strength threshold, where determining whether a WLAN device is capable of exchanging FTM frames is in response to determining that the signal strength is less than a signal strength threshold.

In a third aspect, alone or in combination with one or more of the first and second aspects, determining whether a WLAN device is capable of exchanging FTM frames may include obtaining, from the WLAN device, a capabilities element indicating the WLAN device is capable of exchanging FTM frames.

In a fourth aspect, alone or in combination with one or more of the first through third aspects, determining the first distance is based, at least in part, on FTM frames exchanged with the WLAN device may include outputting the FTM frames for transmission to the WLAN device, obtaining FTM ACKs associated with the FTM frames from the WLAN device, determining a RTT based, at least in part, on the FTM frames and the FTM ACKs, and determining the first distance based, at least in part, on the RTT.

In a fifth aspect, alone or in combination with one or more of the first through fourth aspects, steering the WLAN device may include selecting steering information based, at least in part, on the location of the WLAN device, where the steering information indicates whether to steer the WLAN device based, at least in part, on the location. In the fifth aspect, steering the WLAN device may include determining to steer the WLAN device to the second AP based, at least in part, on the steering information.

In a sixth aspect, alone or in combination with one or more of the first through fifth aspects, obtaining the indication of the second distance may include receiving an FTM range report that indicates the second distance.

In a seventh aspect, alone or in combination with one or more of the first through sixth aspects, the first method may include outputting an FTM request for transmission to the WLAN device. In the seventh aspect, the first method may include obtaining an FTM acknowledgement from the WLAN device. In the seventh aspect, the first method may include, in response to obtaining the FTM acknowledgment, exchanging the FTM frames with the WLAN device.

In an eighth aspect, alone or in combination with one or more of the first through seventh aspects, the first method may include obtaining, from the second AP, distance information including the indication of the second distance.

In a ninth aspect, alone or in combination with one or more of the first through eighth aspects, the first method may also include obtaining distance information from other APs in the WLAN, the distance information indicating other distances from the other APs to the WLAN device.

In a tenth aspect, alone or in combination with one or more of the first through ninth aspects, the first method may include determining a third distance from the first AP to the WLAN device based, at least in part, on additional FTM frames exchanged with the WLAN device. In the tenth aspect, the first method may include steering the WLAN device from a first frequency band of the first AP to a second frequency band of the first AP based, at least in part, on the third distance.

In an eleventh aspect, alone or in combination with one or more of the first through tenth aspects, the first method may include after steering the WLAN device, determining a signal strength of communications received from the WLAN device. In the eleventh aspect, the first method may include, after steering the WLAN device, determining that the signal strength is greater than a signal strength threshold. In the eleventh aspect, the first method may include, after steering the WLAN device, updating steering information to indicate the location and the signal strength.

In some aspects, a second method for wireless communication in a WLAN performed by an apparatus of an AP may include determining whether a WLAN device is capable of exchanging FTM frames. The second method may include, in response to determining the WLAN device is capable of exchanging the FTM frames, determining a distance from the AP to the WLAN device based, at least in part, on FTM frames exchanged with the WLAN device. The second method may include, in response to determining the WLAN device is capable of exchanging the FTM frames, steering the WLAN device from a first frequency band of the AP to a second frequency band of the AP based, at least in part, on the distance.

The second method may include additional aspects, such as any single aspect or any combination of aspects described below or in connection with one or more other methods described elsewhere herein.

In a first aspect, the second method may include determining a signal strength of a signal received from the WLAN device. In the first aspect, the second method may include determining that the signal strength is less than a signal strength threshold, where determining whether a WLAN device is capable of exchanging FTM frames is in response to determining that the signal strength is less than a signal strength threshold.

In a second aspect, alone or in combination with the first aspect, the second method may include determining the AP has a wireless association with the WLAN device via the first frequency band. In the second aspect, the second method may include determining that the WLAN device is outside a first range of the first frequency band of the AP based, at least in part, on the distance.

In a third aspect, alone or in combination with one or more of the first and second aspects, the second method may include determining the WLAN is within a second range of the second frequency band.

In a fourth aspect, alone or in combination with one or more of the first through third aspects, the second method may include outputting the FTM frames for transmission to the WLAN device. In the fourth aspect, the second method may include obtaining FTM ACKs from the WLAN device.

In a fifth aspect, alone or in combination with one or more of the first through fourth aspects, steering the WLAN device may include selecting steering information based, at least in part, on the distance from the AP to the WLAN device. In the fifth aspect, the steering the WLAN device may include determining to steer the WLAN device to the second frequency band based, at least in part, on the steering information.

In a sixth aspect, alone or in combination with one or more of the first through fifth aspects, the method may include after steering the WLAN device, determining a signal strength of communications received from the WLAN device. In the sixth aspect, the method may include, after steering the WLAN device, determining that the signal strength is greater than a signal strength threshold. In the sixth aspect, the method may include, after steering the WLAN device, updating steering information to indicate the distance and the signal strength.

In some aspects, an apparatus of a first AP for wireless communication may include a processor configured to determine whether a WLAN device of a WLAN is capable of exchanging FTM frames. The processor may be configured to, in response to a determination that the WLAN device is capable of exchanging the FTM frames, determine a first distance from the first AP to the WLAN device based, at least in part, on FTM frames exchanged with the WLAN device. The processor may be configured to, in response to a determination that the WLAN device is capable of exchanging the FTM frames, obtain an indication of a second distance between a second AP and the WLAN device. The processor may be configured to, in response to a determination that the WLAN device is capable of exchanging the FTM frames, determine a location of the WLAN device based, at least in part, on the first distance and the second distance. The apparatus of the first AP may include an interface configured to output a message to steer the WLAN device to the second AP based, at least in part, on the location of the WLAN device.

The apparatus of the first AP may include additional aspects, such as any single aspect or any combination of aspects described below or in connection with one or more other apparatuses described elsewhere herein.

In a first aspect, the processor may be further configured to determine a signal strength of a signal received from the WLAN device, and determine that the signal strength is less than a signal strength threshold, where the determination whether a WLAN device is capable of exchanging FTM frames is in response to determining that the signal strength is less than a signal strength threshold.

In a second aspect, alone or in combination with the first aspect, the processor may be further configured to obtain the indication of the second distance from an FTM range report.

In a third aspect, alone or in combination with one or more of the first and second aspects, the interface may be further configured to output the FTM frames for transmission to the WLAN device, and obtain FTM ACKs from the WLAN device. In the third aspect, the processor may be further configured to determine an RTT based on the FTM frames and the FTM ACKs, and determine the first distance based on the RTT.

In a fourth aspect, alone or in combination with one or more of the first through third aspects, the processor may be further configured to select steering information based, at least in part, on the location of the WLAN device, where the steering information indicates whether to steer the WLAN device based, at least in part, on the location. In the fourth aspect, the processor may be further configured to determine to steer the WLAN device to the second AP based, at least in part, on the steering information.

In a fifth aspect, alone or in combination with one or more of the first through fourth aspects, the processor may be further configured to determine the location is outside a first coverage area of a first frequency band of the first AP and within a second coverage area of a second frequency band of the first AP. In the fifth aspect, the processor may be further configured to steer the WLAN device from the first frequency band of the first AP to the second frequency band of the first AP based, at least in part, on the location.

In a sixth aspect, alone or in combination with one or more of the first through fifth aspects, the processor may be further configured to determine a third distance from the first AP to the WLAN device based, at least in part, on additional FTM frames exchanged with the WLAN device. In the sixth aspect, the processor may be further configured to steer the WLAN device from a first frequency band of the first AP to a second frequency band of the first AP based, at least in part, on the third distance.

In some aspects, an apparatus for wireless communication of an AP may include a processor configured to determine whether a WLAN device of a WLAN is capable of exchanging FTM frames. The processor may be configured to, in response to a determination that the WLAN device is capable of exchanging the FTM frames, determine a distance from the AP to the WLAN device based, at least in part, on FTM frames exchanged with the WLAN device. The processor may be configured to, in response to a determination that the WLAN device is capable of exchanging the FTM frames, steer the WLAN device from a first frequency band of the AP to a second frequency band of the AP based, at least in part, on the distance.

The apparatus for wireless communication of an AP may include additional aspects, such as any single aspect or any combination of aspects described below or in connection with one or more other apparatuses described elsewhere herein.

In a first aspect, the processor may be further configured to determine a signal strength of a signal received from the WLAN device. In the first aspect, the processor may be further configured to determine that the signal strength is less than a signal strength threshold, where the determination whether a WLAN device is capable of exchanging FTM frames is in response to determining that the signal strength is less than a signal strength threshold.

In a second aspect, alone or in combination with the first aspect, the processor may be further configured to determine the AP has a wireless association with the WLAN device via the first frequency band, and determine that the WLAN device is outside a first coverage area of the first frequency band of the AP based, at least in part, on the distance.

In a third aspect, alone or in combination with one or more of the first and second aspects, the processor may be further configured to select steering information based, at least in part, on the distance of the WLAN device, and determine to steer the WLAN device to the second frequency band based, at least in part, on the steering information.

What is claimed is:

1. A method for wireless communication in a wireless local area network (WLAN) performed by an apparatus of a first access point (AP), comprising:
    obtaining one or more signals from a non-AP station (STA);
    obtaining, at the AP from the non-AP STA via a capabilities element, an indication of a capability of the non-AP STA to exchange fine timing measurement (FTM) frames in response to a signal strength of the one or more signals from the non-AP STA being less than a signal strength threshold;
    performing an FTM frame exchange with the non-AP STA in accordance with the capability of the non-AP STA to exchange FTM frames, wherein a first distance between the first AP and the non-AP STA is obtained from the FTM frame exchange;
    obtaining an indication of a second distance between a second AP and the non-AP STA; and
    outputting a message to steer the non-AP STA to the second AP in accordance with the first distance and the second distance.

2. The method of claim 1, wherein the message to steer the non-AP STA to the second AP is associated with a relative location of the non-AP STA with respect to the first AP and the second AP.

3. The method of claim 1, further comprising:
    outputting the FTM frames for transmission to the non-AP STA;
    obtaining FTM acknowledgements (ACKs) associated with the FTM frames from the non-AP STA;
    determining a round-trip time (RTT) based, at least in part, on the FTM frames and the FTM ACKs; and
    determining the first distance based, at least in part, on the RTT.

4. The method of claim 1, further comprising:
    selecting steering information based, at least in part, on a location of the non-AP STA, wherein the steering information indicates whether to steer the non-AP STA based, at least in part, on the location; and
    determining to steer the non-AP STA to the second AP based, at least in part, on the steering information.

5. The method of claim 1, wherein obtaining the indication of the second distance comprises:
    receiving an FTM range report that indicates the second distance.

6. The method of claim 1, further comprising:
    outputting an FTM request for transmission to the non-AP STA;
    obtaining an FTM acknowledgement from the non-AP STA; and
    in response to obtaining the FTM acknowledgement, exchanging the FTM frames with the non-AP STA.

7. The method of claim 1, further comprising:
    obtaining, from the second AP, distance information including the indication of the second distance.

8. The method of claim 1, further comprising:
    obtaining distance information from other APs in the WLAN, the distance information indicating other distances from the other APs to the non-AP STA.

9. The method of claim 1, further comprising:
    determining a third distance from the first AP to the non-AP STA based, at least in part, on additional FTM frames exchanged with the non-AP STA; and
    steering the non-AP STA from a first frequency band of the first AP to a second frequency band of the first AP based, at least in part, on the third distance.

10. The method of claim 1, wherein, after steering the non-AP STA, the method further comprises:
    determining a signal strength of communications received from the non-AP STA; and
    determining that the signal strength is greater than the signal strength threshold.

11. A method for wireless communication in a wireless local area network (WLAN) performed by an apparatus of an access point (AP), comprising:
    obtaining one or more signals from a non-AP station (STA);
    obtaining, at the AP from the non-AP STA via a capabilities element, an indication of a capability of the non-AP STA to exchange fine timing measurement (FTM) frames in response to a signal strength of the one or more signals from the non-AP STA being less than a signal strength threshold;
    performing an FTM frame exchange with the non-AP STA in accordance with the capability of the non-AP STA to exchange FTM frames, wherein a distance between the AP and the non-AP STA is obtained from the FTM frame exchange; and
    outputting a message to steer the non-AP STA from a first frequency band to a second frequency band in accordance with the distance between the AP and the non-AP STA.

12. The method of claim 11, further comprising:
    determining the AP has a wireless association with the non-AP STA via the first frequency band; and
    determining that the non-AP STA is outside a first range of the first frequency band of the AP based, at least in part, on the distance.

13. The method of claim 12, further comprising:
    determining the non-AP STA is within a second range of the second frequency band.

14. The method of claim 11, further comprising:
    outputting the FTM frames for transmission to the non-AP STA; and
    obtaining FTM acknowledgements (ACKs) from the non-AP STA.

15. The method of claim 11, wherein steering the non-AP STA comprises:
   selecting steering information based, at least in part, on the distance from the AP to the non-AP STA; and
   determining to steer the non-AP STA to the second frequency band based, at least in part, on the steering information.

16. The method of claim 11, wherein, after steering the non-AP STA, the method further comprises:
   determining a signal strength of communications received from the non-AP STA; and
   determining that the signal strength is greater than the signal strength threshold.

17. A first access point (AP) for wireless communication, comprising:
   one or more memories; and
   one or more processors coupled to the one or more memories, the one or more processors individually or collectively configured to cause the first AP to:
      obtain one or more signals from a non-AP station (STA);
      obtain, at the AP from the non-AP STA via a capabilities element, an indication of a capability of the non-AP STA to exchange fine timing measurement (FTM) frames in response to a signal strength of the one or more signals from the non-AP STA being less than a signal strength threshold;
      perform an FTM frame exchange with the non-AP STA in accordance with the capability of the non-AP STA to exchange FTM frames, wherein a first distance between the first AP and the non-AP STA is obtained from the FTM frame exchange;
      obtain an indication of a second distance between a second AP and the non-AP STA; and
      output a message to steer the non-AP STA to the second AP in accordance with the first distance and the second distance.

18. The first AP of claim 17, wherein the one or more processors are further configured to cause the AP to:
   obtain the indication of the second distance from an FTM range report.

19. The first AP of claim 17, wherein the one or more processors are further configured to cause the AP to:
   output FTM frames for transmission to the non-AP STA;
   obtain FTM acknowledgements (ACKs) from the non-AP STA;
   determine a round-trip time (RTT) based on the FTM frames and the FTM ACKs; and
   determine the first distance based on the RTT.

20. The first AP of claim 17, wherein the one or more processors are further configured to cause the AP to:
   select steering information based, at least in part, on a location of the non-AP STA, wherein the steering information indicates whether to steer the non-AP STA based, at least in part, on the location; and
   determine to steer the non-AP STA to the second AP based, at least in part, on the steering information.

21. The first AP of claim 17, wherein the one or more processors are further configured to cause the AP to:
   determine a location of the non-AP STA is outside a first coverage area of a first frequency band of the first AP and within a second coverage area of a second frequency band of the first AP, and
   steer the non-AP STA from the first frequency band of the first AP to the second frequency band of the first AP based, at least in part, on the location.

22. The first AP of claim 17, wherein the one or more processors are further configured to cause the AP to:
   determine a third distance from the first AP to the non-AP STA based, at least in part, on additional FTM frames exchanged with the non-AP STA, and
   steer the non-AP STA from a first frequency band of the first AP to a second frequency band of the first AP based, at least in part, on the third distance.

23. An access point (AP), comprising:
   one or more memories; and
   one or more processors coupled to the one or more memories, the one or more processors individually or collectively configured to cause the AP to:
      obtain one or more signals from a non-AP station (STA);
      obtain, at the AP from the non-AP STA via a capabilities element, an indication of a capability of the non-AP STA to exchange fine timing measurement (FTM) frames in response to a signal strength of the one or more signals from the non-AP STA being less than a signal strength threshold;
      perform an FTM frame exchange with the non-AP STA in accordance with the capability of the non-AP STA to exchange FTM frames, wherein a distance between the AP and the non-AP STA is obtained from the FTM frame exchange; and
      output a message to steer the non-AP STA from a first frequency band to a second frequency band in accordance with the distance between the AP and the non-AP STA.

24. The AP of claim 23, wherein the one or more processors are further configured to cause the AP to:
   determine the AP has a wireless association with the non-AP STA via the first frequency band; and
   determine that the non-AP STA is outside a first coverage area of the first frequency band of the AP based, at least in part, on the distance.

25. The AP of claim 23, wherein the one or more processors are further configured to cause the AP to:
   select steering information based, at least in part, on the distance of the non-AP STA; and
   determine to steer the non-AP STA to the second frequency band based, at least in part, on the steering information.

* * * * *